United States Patent
O'Shaughnessy et al.

(10) Patent No.: US 11,999,641 B2
(45) Date of Patent: Jun. 4, 2024

(54) METHOD AND APPARATUS FOR MULTI-DESELECTION IN WASTEWATER TREATMENT

(71) Applicants: Hampton Roads Sanitation District, Virginia Beach, VA (US); D.C. Water and Sewer Authority, Washington, DC (US); Bernhard Wett, Innsbruck (AT); Sudhir Murthy, Herndon, VA (US); Maureen O'Shaughnessy, Herndon, VA (US)

(72) Inventors: Maureen O'Shaughnessy, Herndon, VA (US); Christine deBarbadillo, Washington, DC (US); Charles Bott, Virginia Beach, VA (US); Haydee De Clippeleir, Washington, DC (US); Bernhard Wett, Innsbruck (AT); Sudhir Murthy, Herndon, VA (US)

(73) Assignees: HAMPTON ROADS SANITATION DISTRICT, Virginia Beach, VA (US); D.C. WATER AND SEWER AUTHORITY, Washington, DC (US)

( * ) Notice: Subject to any disclaimer, the term of this patent is extended or adjusted under 35 U.S.C. 154(b) by 13 days.

(21) Appl. No.: 17/654,790

(22) Filed: Mar. 14, 2022

(65) Prior Publication Data
US 2022/0289603 A1 Sep. 15, 2022

Related U.S. Application Data

(60) Provisional application No. 63/160,497, filed on Mar. 12, 2021.

(51) Int. Cl.
C02F 3/12 (2023.01)
C02F 3/02 (2023.01)

(52) U.S. Cl.
CPC ............ *C02F 3/1236* (2013.01); *C02F 3/025* (2013.01); *C02F 3/1263* (2013.01); *C02F 3/1268* (2013.01); *C02F 2301/046* (2013.01)

(58) Field of Classification Search
CPC ...... C02F 3/1236; C02F 3/025; C02F 3/1263; C02F 3/1268; C02F 2301/046; C02F 3/302; C02F 3/1215; C02F 1/385; Y02W 10/10
(Continued)

(56) References Cited

U.S. PATENT DOCUMENTS 3,226,317 A 12/1965 Albertson
3,468,794 A 9/1969 Amero
(Continued)

FOREIGN PATENT DOCUMENTS

CA 2780017 A1 5/2011
CA 2852492 11/2014
(Continued)

OTHER PUBLICATIONS

A.N. Katsogiannis, et al. "Enhanced nitrogen removal in SBRs bypassing nitrate generation accomplished by multiple aerobic/anoxic phase pairs" Water Science and Tech. vol. 47, No. 11, pp. 53-59 (2003).
(Continued)

*Primary Examiner* — Ekandra S. Miller-Cruz
(74) *Attorney, Agent, or Firm* — Ice Miller LLP; Safet Metjahic

(57) ABSTRACT

This disclosure relates to physical selection, deselection or outselection for smaller, less dense, sheared or compressed particles in sludge, wherein the first deselection step occurs at the reactor or at a clarification step, by separately deselecting for such particles and then a second deselection step occurs in an external selector. This double deselection
(Continued)

promotes the more efficient removal of slow settling particles, while simultaneously allowing for maintenance of multiple solids residence times for fast and slow growing organisms. The deselection in a clarifier occurs typically at the periphery of the tank or at the surface of a blanket using a positive or negative pressure device. Structures such as slotted or perforated plates, pipes or manifolds can be used to assist in such deselection. Baffles can also be used for such deselection.

8 Claims, 16 Drawing Sheets

(58) Field of Classification Search
USPC .......................................................... 210/623
See application file for complete search history.

(56) References Cited

U.S. PATENT DOCUMENTS

| | | |
|---|---|---|
| 4,056,465 A | 11/1977 | Spector |
| 4,415,452 A | 11/1983 | Heil |
| 4,891,136 A | 1/1990 | Voyt |
| 5,342,522 A | 8/1994 | Marsman |
| 5,582,733 A | 12/1996 | Desbos |
| 5,645,799 A | 7/1997 | Shah |
| 5,863,435 A | 1/1999 | Heijnen |
| 6,183,642 B1 | 2/2001 | Heijnen |
| 6,309,547 B1 | 10/2001 | Burke |
| 6,383,390 B1 | 5/2002 | Van Loosdrecht |
| 6,406,617 B1 | 6/2002 | Brauchli |
| 6,566,119 B1 | 5/2003 | Heijnen |
| 6,605,220 B2 | 8/2003 | Garcia |
| 6,645,386 B1 | 11/2003 | Moreau |
| 7,060,185 B2 | 6/2006 | Kim |
| 7,273,553 B2 | 9/2007 | Van Loosdrecht |
| 7,481,934 B2 | 1/2009 | Skillicorn |
| 7,569,147 B2 | 8/2009 | Curtis |
| 7,604,740 B2 | 10/2009 | Baur |
| 7,846,334 B2 | 12/2010 | Wett |
| 8,157,988 B2 | 4/2012 | Quevillon |
| 8,241,717 B1 | 8/2012 | Anderson |
| 8,268,169 B2 | 9/2012 | Lean |
| 8,623,205 B2 | 1/2014 | Woodard |
| 8,911,628 B2 | 12/2014 | Nyhuis |
| 9,242,882 B2 | 1/2016 | Nyhuis |
| 9,358,505 B2 | 6/2016 | Cumin |
| 9,670,083 B2 | 6/2017 | Wett |
| 2001/0033527 A1 | 10/2001 | Smith |
| 2001/0045382 A1 | 11/2001 | Nasr |
| 2002/0020666 A1 | 2/2002 | Cote |
| 2003/0232107 A1 | 12/2003 | Terry |
| 2004/0229343 A1 | 11/2004 | Husain |
| 2005/0087480 A1 | 4/2005 | Park |
| 2006/0283796 A1 | 12/2006 | Tokutomi |
| 2007/0000836 A1 | 1/2007 | Elefritz, Jr. |
| 2007/0144965 A1 | 6/2007 | Morris |
| 2007/0217856 A1 | 9/2007 | Kott |
| 2007/0241041 A1 | 10/2007 | Shimamura |
| 2008/0210613 A1 | 9/2008 | Wechsler |
| 2008/0217212 A1 | 9/2008 | Garner |
| 2008/0217244 A1 | 9/2008 | Gaid |
| 2008/0223784 A1 | 9/2008 | Martin |
| 2008/0223789 A1 | 9/2008 | Hasan |
| 2009/0221054 A1 | 9/2009 | Wett |
| 2009/0221854 A1 | 9/2009 | Oevering |
| 2009/0272690 A1 | 11/2009 | Wett |
| 2009/0282882 A1 | 11/2009 | Verhave |
| 2010/0102006 A1 | 4/2010 | Quevillon |
| 2010/0170845 A1 | 7/2010 | Baur |
| 2010/0219125 A1 | 9/2010 | Northrop |
| 2010/0288693 A1 | 11/2010 | Vion |
| 2010/0303695 A1 | 12/2010 | Gonzalez Ospina |
| 2011/0000851 A1 | 1/2011 | Vanotti |
| 2011/0049047 A1 | 3/2011 | Cumin |
| 2011/0084022 A1 | 4/2011 | Lee |
| 2011/0100908 A1 | 5/2011 | Stephenson |
| 2011/0198284 A1 | 8/2011 | Nyhuis |
| 2011/0284461 A1 | 11/2011 | Dimassimo |
| 2012/0048802 A1 | 3/2012 | Brown |
| 2012/0261335 A1 | 10/2012 | Lemaire |
| 2012/0305477 A1 | 12/2012 | Stroot |
| 2013/0028841 A1 | 1/2013 | Yagi |
| 2013/0134089 A1 | 5/2013 | Cote |
| 2013/0153493 A1 | 6/2013 | Young |
| 2013/0196403 A1 | 8/2013 | Bowers |
| 2013/0256217 A1 | 10/2013 | Lemaire |
| 2014/0069863 A1 | 3/2014 | Wett |
| 2014/0069864 A1 | 3/2014 | Wett |
| 2014/0083936 A1 | 3/2014 | Murthy |
| 2014/0144836 A1 | 5/2014 | Nyhuis |
| 2014/0158618 A1 | 6/2014 | Zha |
| 2014/0178281 A1 | 6/2014 | Bowers |
| 2014/0202333 A1 | 7/2014 | Pomerleau |
| 2014/0263041 A1 | 9/2014 | Regmi |
| 2014/0291239 A1 | 10/2014 | Wang |
| 2014/0305867 A1 | 10/2014 | Nyhuis |
| 2014/0360933 A1 | 12/2014 | Rezania |
| 2015/0108067 A1 | 4/2015 | Calhoun |
| 2015/0284280 A1 | 10/2015 | Huang |
| 2015/0336826 A1 | 11/2015 | Peeters |
| 2015/0368131 A1 | 12/2015 | Garrido Fernandez |
| 2016/0002081 A1 | 1/2016 | Cote |
| 2016/0145131 A1 | 5/2016 | Manic |
| 2016/0264437 A1 | 9/2016 | Liu |
| 2018/0009687 A1 | 1/2018 | Murthy |
| 2019/0263696 A1 | 8/2019 | Bott |
| 2021/0355012 A1 | 11/2021 | Lemaire |
| 2022/0194832 A1 | 6/2022 | Fraser |

FOREIGN PATENT DOCUMENTS

| | | |
|---|---|---|
| CA | 3074480 A1 | 3/2019 |
| CA | 3135606 A1 | 10/2020 |
| CN | 2767430 | 3/2006 |
| CN | 1903752 | 1/2007 |
| CN | 101296870 | 10/2008 |
| CN | 101370738 | 2/2009 |
| CN | 101568493 | 10/2009 |
| CN | 101970360 | 2/2011 |
| CN | 102153198 | 8/2011 |
| CN | 102209689 | 10/2011 |
| CN | 102211811 | 10/2011 |
| CN | 202036825 | 11/2011 |
| CN | 203048739 U | 7/2013 |
| CN | 103663725 | 3/2014 |
| CN | 103936150 A | 7/2014 |
| CN | 104276657 A | 1/2015 |
| CN | 104291528 A | 1/2015 |
| CN | 104291529 A | 1/2015 |
| CN | 104310580 A | 1/2015 |
| CN | 105110572 A | 12/2015 |
| CN | 105129991 A | 12/2015 |
| CN | 105384247 A | 3/2016 |
| CN | 105481093 A | 4/2016 |
| CN | 105712584 A | 6/2016 |
| CN | 105753155 A | 7/2016 |
| CN | 105923774 A | 9/2016 |
| CN | 111233146 A | 6/2020 |
| DE | 3628203 | 2/1988 |
| DE | 4016457 | 2/1992 |
| DE | 19855794 | 6/2000 |
| DE | 102005045170 | 3/2007 |
| EP | 0544226 | 6/1993 |
| EP | 0872451 | 12/2002 |
| EP | 1634854 | 3/2006 |
| EP | 1634855 | 3/2006 |
| EP | 2341033 | 7/2011 |
| EP | 2341033 A2 | 7/2011 |
| EP | 2740713 | 6/2014 |
| ES | 2334321 | 3/2010 |
| FR | 2985996 | 7/2013 |
| GB | 2228930 | 9/1990 |

(56) References Cited

FOREIGN PATENT DOCUMENTS

| | | |
|---|---|---|
| JP | S58104696 | 6/1983 |
| JP | H06304589 | 11/1994 |
| JP | H08257583 | 10/1996 |
| JP | 2001096297 | 4/2001 |
| JP | 2001104982 | 4/2001 |
| JP | 2003010874 | 1/2003 |
| JP | 2003088889 | 3/2003 |
| JP | 3866053 | 1/2007 |
| JP | 2008221160 | 9/2008 |
| JP | 2008284427 | 11/2008 |
| JP | 2012501845 | 1/2012 |
| KR | 20020072360 A | 9/2002 |
| RU | 2334685 | 9/2008 |
| RU | 2454374 | 6/2012 |
| WO | 9219547 A1 | 11/1992 |
| WO | 9705070 | 2/1997 |
| WO | 0228780 A2 | 4/2002 |
| WO | 2006022539 A1 | 3/2006 |
| WO | 2006102362 A2 | 9/2006 |
| WO | 2006129132 | 12/2006 |
| WO | 2006129132 A1 | 12/2006 |
| WO | 2007011890 | 1/2007 |
| WO | 2007050775 | 5/2007 |
| WO | 2008141413 | 11/2008 |
| WO | 2010055776 | 5/2010 |
| WO | 2011148949 | 12/2011 |
| WO | 2012019310 | 2/2012 |
| WO | 2012019310 A1 | 2/2012 |
| WO | 2012085288 | 6/2012 |
| WO | 2012085288 A1 | 6/2012 |
| WO | 2013151434 | 10/2013 |
| WO | 2014043547 A1 | 3/2014 |
| WO | 2014047459 A1 | 3/2014 |
| WO | 2014085662 | 6/2014 |
| WO | 2014085662 A1 | 6/2014 |
| WO | 2014152872 A1 | 9/2014 |
| WO | 2015179700 A2 | 11/2015 |
| WO | 2016004082 A1 | 1/2016 |
| WO | 2018009348 A1 | 1/2018 |
| WO | 2018217587 A1 | 11/2018 |
| WO | 2020076755 A1 | 4/2020 |
| WO | 2020086407 A1 | 4/2020 |
| WO | 2022072270 A1 | 4/2022 |

OTHER PUBLICATIONS

Abeling et al. "Anaerobic-Aerobic Treatment of High Strength Ammonium Wastewater—Nitrogen Removal via Nitrite," Wat. Sci. Tech. vol. 26, No. 5-6, pp. 1007-1015, 1992.
Alleman et al. "Storage-Induced Denitrification Using Sequencing Batch Reactor Operation," Water Research vol. 14. pp. 1483-14885, 1980.
Anonymous, "New Mexico Wastewater Systems Operator Certification Study Manual", (Nov. 1, 2007), pp. 1-242, URL: https://www.env.nm.gov/swqb/FOT/WastewaterStudyManual/WastewaterOperatorStudyManual.pdf, (Jul. 6, 2017), XP055388522.
Anthonisen et al. "Inhibition of Nitrification by Ammonia and Nitrous Acid," Water Pollution Control Federation vol. 28, No. 5, pp. 835-852, 1976.
Bernet, et al. "Nitrification at Low Oxygen Concentration in Biofilm Reactor" Journal of Environmental Engineering Mar. 2001 pp. 266-271.
Blackburne, et al "Partial nitrification to nitrite using low dissolved oxygen concentraion as the main factor" Springer Science+Business Media B.V. 2007.
C.S. Gee, et al. "Nitrite accumulation followed by denitrification using sequencing batch reactor," Water Science and Technology vol. 49 No. 5 pp. 47-55, (2004).
Chinese Office Action issued in Chinese Application No. 201380071506. 5, dated Aug. 16, 2017.
Chudoba et al. "Control of Activated Sludge Filamentous Bulking II. Selection of Microorganisms by Means of a Selector," Water Res., 7, 1389, 1973 pp. 1389-1406.
Ciudad, et al. "Partial nitrification of high ammonia concentration wastewater as a part of a shortcut biological nitrogen removal process" Process Biochemistry 40 (2005), 1715-1719.
Daebel et al. "Exploring Temporal Variations of Oxygen Saturation Constants of Nitrifying Bacteria," Water Research 41, pp. 1094-1102, 2007.
Dangcong Peng et al. "Aerobic Granular Sludge," A Case Report Water Research, vol. 33 No. 3 pp. 880-893, 1999.
Davoli et al. "Testing the effect of selectors in the control of bulking and foaming in small activated sludge plants," Water Sci Technol. 46(1-2):495-8, 2002.
Fux, et al. "Biological treatment of ammonium-rich wastewater by partial nitritation and subsequent anaerobic ammonium oxidation (anammox) in a pilot plant" Journal of Biotechnology 99 (2002) 295-306.
Gabb et al. "The Selector Effect on Filamentous Bulking in Long Sludge Age Activated Sludge Systems," Water Sci. Technol., vol. 23, Kyoto, pp. 867-877, 1991.
Gao, et al. "Shortcut nitrification-denitrification by real-time control strategies," Bioresource Technology; journal homepage: www.elsevier.com/locate/biortech; p. 2298-2300, (2009).
Guo et al. "Effective and Robust Partial Nitrification to Nitrite by Real-time Aeration Duration Control in an SBR Treating Domestic Wastewater," Process Biochemistry 44, 2009, pp. 979-985.
Hanaki et al. "Nitrification at Low Levels of Dissolved Oxygen With and Without Organix Loading in a Suspended-Growth Reactor," Wat. Res. vol. 24, No. 3, pp. 297-302, 1990.
Hellinga et al. "The Sharon Process: An Innovative Method for Nitrogen Removal From Ammonium-Rich Waste Water," Water Science and Technology vol. 37 Issue 9, pp. 135-142, 1998.
Hippen et al. "Aerobic Deamoonification: A New Experience in the Treatment of Wastewaters," Wat. Sci. Tech. vol. 35, No. 10, pp. 111-120, 1997.
International Search Report from Related PCT application No. PCT/US13/072345, dated Mar. 20, 2014.
IPRP for PCT International Application No. PCT/US2015/041622 dated Jan. 24, 2017.
Ju et al. "Simultaneous Nitrification, Denitrification, and Phosphorous Removal in Single-Tank Low-Dissolved-Oxygen Systems Under Cyclic Aeration," Water Env. Res., 2007, vol. 78, No. 8.
Kim et al. "Comparison Study of the Effects of Temperature and Free Ammonia Concentration on Nitrification and Nitrite Accumulation," Process Biochemistry 43, 154-160, 2008.
Kornaros et al. "Partial Nitrification/Denitrification Can be Attributed to the Slow Response of Nitrite Oxidizing Bacteria to Periodic Anoxic Disturbances," Env. Sci., 2008, Environ. Sci. Technol. 2010, 7245-7253.
Laanbroek et al. "Competition for Limiting Amounts of Oxygen between Nitrosomonas Europaea and Nitrobacter Winogradskyi Grown in Mixed Continuous Cultures," Arch Micro, 1993, Arch Microbiol (1993) 159: 453-459.
Lebek et al. "Control of the Growth of Microthrix parvicella by Using an Aerobic Selector—Results of Pilot and Full Scale Plant Operation," Water Sci. Technol., 46(1-2), 2002, pp. 491-494.
Li et al. "Partial Nitritation of Landfill Leachate with Varying Influent Composition under Intermittent Aeration Conditions," Process Safety and Env. Prot. V 91 Issue 4, 2013.
Ling, "Experience from Commissioning of Full-scale DeAmmon plant at Himmerfjarden," Proceedings of 2nd IWA Specialized Conference, Lemtech Konsulting, ed., pp. 403-410.
Manser, et al. "Consequences of mass transfer effects on the kinetics of nitrifiers" Water Research 39 (2005) pp. 4633-4642.
Marshall et al. "Selectors in Pulp and Paper Mill-activated Sludge Operations: Do they work?" Pulp and Paper Canada, 101(3), 48-53, 2000.
Marten et al. "Full-scale evaluation of factors affecting the performance of anoxic selectors," Water Environ. Res., 69 (7), 1272-1289, 1997.
Morgenroth et al. "Aerobic Granular Sludge in a Sequencing Batch Reactor," Water Research, vol. 31 No. 12 pp. 3191-3194, 1997.

(56) References Cited

OTHER PUBLICATIONS

Osterreichischer Wasser-Und Abfallwirtschaftsverband, "Klaranlagenzustandsbericht: OWAV 0 Arbeisbehelf Nr. 22", dated Jan. 29, 2001. (With Partial English Translation).
Parker et al. "Discussion of: Full-scale evaluation of factors affecting the performance of anoxic selectors," Water Environ. Res., 70(6), 1225-1228, 1998.
Parket et al. "Making classifying selectors work for foam elimination in the activated sludge process," Water Environ. Res., 75 (1), 83-91, 2003.
Peng et al. "Nitrite Accumulation by Aeration Controlled in Sequencing Batch Reactors Treating Domestic Wastewater," Water Sci. Tech. vol. 50 No. 10 pp. 35-43, 2004.
Peng et al. "Partial Nitrification from Domestic Wastewater by Aeration Control at Ambient Temperature," Chin. J. Chem. Eng., 15(1) 115-121, 2007.
Pollice, et al. "Influence of aeration and sludge retention time on ammonium oxidation to nitrite and nitrate" Water Research 36 (2002) pp. 2541-2546.
Romain Lemaire, et al. "Achieving the Nitrite Pathway Using Aeration Phase Length Control and Step-Feed in an SBR Removing Nutrients form Abattoir Wastewate" Biotechnology, and Bioengineering (2008).
Russian Office Action issued in Russian Patent Application No. 2015125485, dated Sep. 12, 2017.
Schuler et al., "Microbial storage products, biomass density, and settling properties of enhanced biological phosphorus removal activated sludge," Water Sci. Technol., vol. 43, No. 1, pp. 173-180, 2001.
Search Report for corresponding Chinese Application No. 201380071506.5, dated Feb. 22, 2017.
Silverstein et al. "Performance of SBR Activated Sludge Processes with Nitrification/Denitrification," Water Pollution Control Fed., vol. 55, No. 4, pp. 377-384, 1983.
Sin, et al. "Modelling nitrite in wastewater treatment systems: a discussion of different modelling concepts" Water Science & Technology 58.6 2008 pp. 1155-1171.
Sliekers, et al. "Competition and coexistence of aerobic ammonium- and nitrite-oxidizing bacteria at low oxygen concentrations" Environmental Biotechnology Apr. 8, 2005 p. 808-817.
Trollberg O., "Extremum Seeking Control Applied to a Deammonification Process", Thesis work—Department of Information Technology, Uppsala universitet, (Mar. 30, 2011), URL: http://sjostad.ivl.se/download/18.50a499dd132037d524e80007759/1350483758748/Olle_Trollberg.pdf, (Nov. 2, 2015).
Turk et al. "Maintaining Nitrite Build-Up in a System Acclimated to Free Ammonia," Wat. Res. vol. 23, No. 11, pp. 1383-1388, 1989.
Turk et al. "Preliminary Assessment of a Shortcut in Nitrogen Removal from Wastewater," Canadian Journal of Civil Engineering, vol. 13, Issue 6, 1986.
European Search Report issued in EP22200155.4, dated Mar. 14, 2023.
Jenkins et al. "Manual on the Causes and Control of Activated Sludge Bulking, Foaming, and Other Solids Separation Problems," 3rd edition, Lewis Publishers, USA, 2004.
Schuler, Andrew J., et al. "Causes of Variable Biomass Density and Its Effects on Settleability in Full-Scale Biological Wastewater Treatment Systems", Environ. Sci. Technol. 2007, 41, 1675-1681.
Van Dongen, et al. "The SHARON-Anammox Process for treatment of ammonium rich wastewater" Water Science and Technology vol. 44 No. 1 p. 153-160, (2001).
Water Utilities Technical Assistance Program, "New Mexico Wastewater Systems Operator Certification Study Manual", Utility Operators Certification Program New Mexico Environment Department Surface Water Quality Bureau, Nov. 2007, Version 1.1.
Wett "Sloved upscaling problems for implementing deammonificationof rejection water" Water Science & Technology vol. 53 No. 12 p. 121-128, (2006).
Wett B. et al., "Key Parameters for Control of Demon Deammonification Process", Water Practice, vol. 1, No. 5, (Nov. 30, 2007), pp. 1-11, URL: http://www.essdemon.com/libraries.files/KeyparametersDEMONControl.pdf, (Nov. 2, 2015).
Wett, "Development and implementation of a robust deammonification process," Water Science & Technology, vol. 56, No. 7, pp. 81-88 (2007).
Wett, et al. "Syntrophy of Aerobic and Anaerobic Ammonia Oxidisers" Water Science & Technology—WST 61.8 2010 pp. 1915-1922.
Wong-Chong et al. "Kinetics of Microbial Nitrification: Nitrite-Nitrogen Oxidation," Wat. Res. vol. 12. pp. 605-609, 1978.
Wyffels, et al. "Nitrogen removal from sludge reject water by a two-stage oxygen-limited autotrophic nitrification denitrification process" Water Science and Technology vol. 49, No. 5-6, pp. 57-64 (2004).
Yang et al. "Nitrogen Removal via Short-Cut Simulataneous Nitrification and Denitrification in an Intermittently Aerated Moving Bed Membrane Bioreactor," Haz. Mat. 195, 2011.
Yoo et al. "Nitrogen Removal From Synthetic Wastewater by Simultaneous Nitrification and Denitrification and Denitrification via Nitrite in an Intermittently-Aerated Reactor,", Wat. Res. vol. 33, No. 1, pp. 145-154 1999.
Yu, et al. "Performance Enhancement of SBR Applying Real-Time Control" Journal of Environmental Engineering; Oct. 2000 pp. 943-948.
Zekker, et al. "Achieving nitritation and anammox enrichment in a single moving-bed biofilm reactor treating reject water" Environmental Technology, 33:6, 703-710, (2012).
Zeng et al. "Control and Optimization of Nitrifying Communities for Nitritation from Domestic Wastewater at Room Temperature," Enzyme and Microb. Tech. 45, pp. 226-232, 2009.
Zeng, et al. "Process Control of an Alternating Aerobic-Anoxic Sequencing BAtch Reactor for Nitrogen Removal via Nitrite" Chem. Eng. Technol. 2008, 31, No. 4, 582-587.
Kazulyuzhnyi, S., et al., (2007). "Phylogenetic analysis of a microbial community from a DEAMOX reactor carrying out anaerobic ammonia oxidation under sulphide-driven denitrifying conditions" Presented at Poster Session PT02-Microbial Diversity 11th IWA World Congress on Aanacrobic Digestion, Sep. 23-27, 2007, Brisbane, Australia.
Kazulyuzhnyi, S., et al., (2006). "DEAMOX—new biological nitrogen removal process based on anaerobic ammonia oxidation coupled to sulphide driven conversion of nitrate into nitrite". Water Res., 40, 3637-3645.
International Search Report issued in App. No. PCT/US2022/020266, dated Jun. 30, 2022, 3 pages.
International Search Report issued in App. No. PCT/US2022/071144, dated Jun. 30, 2022, 3 pages.
"New Technologies of Water and Wastewater Treatment (水与废水处理新技 术)", edited by Zhu Lingfeng, pp. 178-180, Xi'an Map Publishing House, Aug. 2007.
"Theory and Case Analysis of Micro-electrolysis Treatment to Refractory Organic Wastewater (微电解法处理难降 解有机废水的理论与实 例分析)", Zeng Chenlin et al., pp. 79-81, China Environment Press, Oct. 2017.
"Engineering Technology of High Efficiency Aquaculture System Construction for Seawater Industrialization (海水工厂 化高效养殖体系构 建工程技术)", Qu Keming et al., pp. 140-143, Ocean Press, Jan. 2010.
Regmi, Pusker, et al. "Control of aeration, aerobic SRT and COD input for mainstream nitritation/denitritation." Water research 57 (2014): 162-171.
Valve, Matti, ed. Nitrogen removal from municipal wastewater. Nordic Council of Ministers, 1995, p. 232.
Kartal, Boran, et al. "Anammox bacteria disguised as denitrifiers: nitrate reduction to dinitrogen gas via nitrite and ammonium." Environmental microbiology 9.3 (2007): 635-642.
Extended European Search Report issued in App. No. EP23200218, dated Nov. 14, 2023, 15 pages.
Regmi Pusker et al: "Control of aeration, aerobic SRT and COD input for mainstream nitritation/denitritation", Water Research, Elsevier, Amsterdam, NL, vol. 57, Mar. 26, 2014 (Mar. 26, 2014), pp. 162-171, XP029021873, ISSN: 0043-1354, DOI: 10.1016/J.WATRES. 2014.03.035 ; & Pusker Regmi et al: "Supplementary Information:

(56) References Cited

OTHER PUBLICATIONS

Control of aeration, aerobic SRT and COD input for mainstream nitritation/denitritation", Water Research., vol. 57, Jun. 1, 2014 (Jun. 1, 2014), pp. 162-171, XP055286042, NL ISSN: 0043-1354, DOI: 10.1016/.

METHOD AND APPARATUS FOR MULTI-DESELECTION IN WASTEWATER TREATMENT

CROSS REFERENCE TO RELATED APPLICATION

This application is entitled to, and hereby claims, priority under 35 U.S.C. § 119(e) to U.S. Provisional Patent Application No. 63/160,497, filed Mar. 12, 2021, titled "Method and Apparatus for Double Deselection in Wastewater Treatment," the disclosure of which is hereby incorporated herein by reference in its entirety.

TECHNICAL FIELD

The present disclosure relates to methods and apparatuses involving physical selection (or deselection) of slow settling particles for collection and management of sludge particles by returning good settling particles, using internal selection, to the biological process while selecting and sending poor settling particles to a waste stream.

BACKGROUND

There are many different types of sludge collectors used in, for example, state-of-the art circular and rectangular clarifiers. These include the use of physical hoppers and baffles, as well as collectors that use vacuum, airlift, or mechanical means to move sludge to an internal hopper or external sludge box. The inventors have discovered an unmet need for a technology solution that can provide improved selection, collection and management of sludge particles in treatment systems and processes that include sludge collectors.

SUMMARY

The disclosure provides a wastewater treatment system, comprising an influent containing contaminated water and a reactor comprising (i) an inlet, (ii) a bioreactor, (iii) an internal deselector, and (iv) an outlet. In an embodiment, (i) the inlet is configured to receive the influent and supply the contaminated water to the bioreactor; (ii) the bioreactor is configured to disperse the contaminated water in a solid-liquid mixture, treat the solid-liquid mixture and form biological solids; (iii) the internal deselector is configured to retain or retard a first portion of the biological solids from the solid-liquid mixture and output a deselected solid-liquid mixture comprising a second portion of the biological solids; and (iv) the outlet is configured receive the deselected solid-liquid mixture and output the deselected solid-liquid mixture, including the second portion of the biological solids, from the reactor. The system comprises: a particle deselector configured to receive the deselected solid-liquid mixture and deselect part of the second portion of the biological solids in the selected solid-liquid mixture to output the deselected part of the second portion of the biological solids; and a return line configured to supply the deselected part of the second portion of the biological solids to the reactor, wherein the particle deselector comprises at least one of a density-based (DB) deselector and a particle size-compressibility (PSC) deselector.

In an embodiment, the internal deselector is configured to deselect the second portion of the biological solids from the solid-liquid mixture based on at least one of pressure differential, flow velocity, flow rate, temperature differential, and electromagnetic energy exposure.

In an embodiment, the particle deselector is configured to deselect the deselected part of the second portion of the biological solids based on at least one of solids particle density, size, shear-resistance, or compressibility.

In an embodiment, the system comprises at least one of a decanter, a clarifier, a separator, a membrane, and a filter configured to separate solid particles having predetermined characteristics from the solid-liquid mixture.

In an embodiment, the biological solids include particles having an average solids residence time (avSRT) for selecting fast and slow growing organisms with different treatment functions, wherein: particles in the deselected part of the second portion of the biological solids have a solids residence time (loSRT) that is lower than the average solids residence time (avSRT); and particles in the retained or the retarded part of the second portion of the biological solids have a solids residence time (hiSRT) that is higher than the average solids residence time (avSRT).

In an embodiment, the deselected part of the second portion of the biological solids includes particles comprising: a sludge volume index less than 80 mL/g; or improved membrane flux or reduced membrane fouling.

In an embodiment, the deselector is configured to apply a negative or a positive pressure at or near: a. a reactor interface of the bioreactor; b. a clarifier interface; c. a surface of the reactor; d. a surface of a settling blanket; e. a periphery of a clarifier; f. a feed zone in the bioreactor, wherein influent or recycles are supplied; or g. a discharge zone in the bioreactor or a clarifier, from which an effluent or recycles are output.

In an embodiment, the deselector comprises: one or more slotted manifolds; one or more perforated manifolds; one or more plates; one or more pipes; or one or more baffles, wherein the pipes are placed at or near a periphery of the reactor or a clarifier and the baffle is configured to direct and separate sludge at the periphery of the reactor or the clarifier.

In an embodiment, the bioreactor comprises a feed zone that receives the influent using a differential influent cascade approach.

In an embodiment, the first portion of the biological solids and said deselected part of the second portion of the biological solids are supplied as recycle streams from the internal deselector and particle deselector, respectively, to at least two different locations in the bioreactor; or the second portion of the biological solids and said deselected part of the second portion of the biological solids are deselected by the internal deselector and particle deselector, respectively, to increase one or more of microbially produced electron donor, electron acceptor or carbon, and to provide at least 20% of electron donor, electron acceptor or carbon requirements for operation of the bioreactor.

In an embodiment, the reactor comprises: a continuous flow reactor; a sequencing batch reactor; a modified sequencing batch reactor; an integrated fixed film activated sludge reactor; an upflow reactor with integrated clarifier; an upflow reactor with integrated decanter; or a membrane bioreactor.

In an embodiment, the internal deselection step is performed using energy within the reactor comprising: a visible, ultraviolet or infrared photo source; a heat source; a gas source; or a pressure or mixing source.

The disclosure provides a method for treating wastewater, comprising: supplying an influent containing contaminated water to a reactor comprising a bioreactor and an internal deselector; treating, by the bioreactor, the contaminated water in a solid-liquid mixture to form biological solids; retaining or retarding, by the internal deselector, a first portion of the biological solids from the solid-liquid mixture; outputting, from the reactor to a particle deselector, a deselected solid-liquid mixture comprising a second portion of the biological solids; deselecting, by the particle deselector, part of the second portion of the biological solids in the selected solid-liquid mixture to output a deselected part of the second portion of the biological solids; and returning at least one of said first portion of the biological solids and said deselected part of the second portion of the biological solids to the bioreactor. The internal deselector can be configured to deselect the second portion of the biological solids from the solid-liquid mixture based on at least one of pressure differential, flow velocity, flow rate, temperature differential, and electromagnetic energy exposure; and the particle deselector is configured to deselect the deselected part of the second portion of the biological solids based on at least one of solids particle density, size, shear-resistance, or compressibility.

In the method, the biological solids can include particles having an average solids residence time (avSRT) for selecting fast and slow growing organisms with different treatment functions, wherein: particles in the deselected part of the second portion of the biological solids have a solids residence time (loSRT) that is lower than the average solids residence time (avSRT); and particles in the retained or the retarted part of the second portion of the biological solids have a solids residence time (hiSRT) that is higher than the average solids residence time (avSRT).

In the method, the deselected part of the second portion of the biological solids can include particles comprising: a sludge volume index less than 80 mL/g; or improved membrane flux or reduced membrane fouling.

In the method, the internal deselector can be configured to apply a negative or a positive pressure at or near: a reactor interface of the bioreactor; a clarifier interface; a surface of the reactor; a surface of a settling blanket; a periphery of a clarifier; a feed zone in the bioreactor, wherein influent or recycles are supplied; or a discharge zone in the bioreactor or a clarifier, from which an effluent or recycles are output.

In the method, the internal deselector can comprise: one or more slotted manifolds; one or more perforated manifolds; one or more plates; one or more pipes; or one or more baffles, wherein the pipes are placed at or near a periphery of the reactor or a clarifier and the baffle is configured to direct and separate sludge at the periphery of the reactor or the clarifier.

In the method, the bioreactor can comprise a feed zone that receives the influent using a differential influent cascade approach.

In the method, the reactor can comprise: a continuous flow reactor; a sequencing batch reactor; a modified sequencing batch reactor; an integrated fixed film activated sludge reactor; an upflow reactor with integrated clarifier; an upflow reactor with integrated decanter; or a membrane bioreactor.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
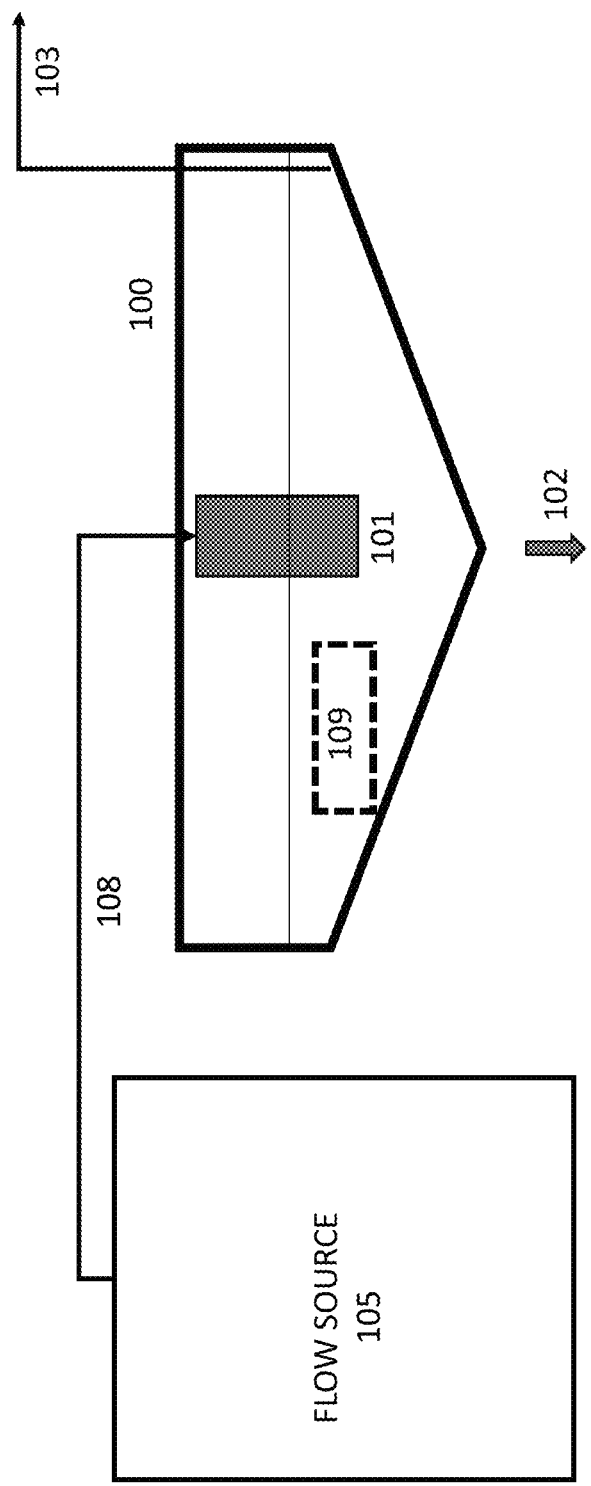
FIG. 1 depicts an embodiment of an internal selection approach at a clarifier periphery.

The present disclosure is further described in the detailed description that follows.

DETAILED DESCRIPTION

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings. The terms "size" and "density selection" are used interchangeably and are incorporated into a single conceptual outcome of densification.

There are several broad approaches to internal physical selection including densification (retention of dense aggregates), and for managing the transport of the selected particles (for example, heavy particles) within the process and the deselection of other particles (for example, light sludge particles).

One approach is to transport particles based on size or density, where there are many internal approaches to a reactor or clarifier for deselection. For example, poorer settling (smaller or less dense) particles can be fed downstream of good settling (larger or more dense) particles within one or more recycle streams, with the poorer settling particles being then exposed to preferential deselection in, for example, a clarifier. The approach of transporting or deselecting poorer settling particles downstream of good settling particles can be achieved using one or more recycle streams, where the better settling or densifying particles can be added or transported upstream of the poorer settling particles or conversely the poorer settling particles can be deselected downstream of good settling particles. Such differentials, as well as their use, in the recycles or deselection is an aspect of the disclosure.

Other size or density approaches can include the use of sludge collectors differentially to collect the lighter fraction thus specifically exposing them to deselection. Many different types of sludge collectors can be used in, for example, state-of-the art circular and rectangular clarifiers. These can include the use of physical hoppers and baffles, as well as collectors that use vacuum, airlift, or mechanical means to move sludge to an internal hopper or external sludge box. All of these can be used for differential selection as an aspect of the disclosure.

Another size or density approach can be to surface collect from the reactor or a clarifier or a settle zone the lighter (smaller or less dense) particles and expose them to deselection. In this approach, the lighter stratifying fraction can be deselected relative to a heavier fraction in a reactor, a clarifier or a transition between a reactor and a clarifier. Such stratification for surface wasting in a clarifier or a sequencing batch reactor is an aspect of the disclosure, including embodiments that include a size or density deselector. The action of removing the lighter fraction and deselection ca be referred to as "surface wasting."

An embodiment of an internal approach can be to cascade the influent or recycle flows to promote selection or deselection using substrate or microorganism diffusion gradient differentials. The concept of retarding the flow of mixed liquor can be achieved by adding a bypass or a series of cascading bypasses of wastewater or wet weather flows to dilute away the sludge as it progresses down a reactor train to address selection or deselection based on differential diffusion of interest or differential feast vs famine conditions, or by different donors or acceptors provided. The organisms downstream thus deselect themselves in the bypass (the term bypass denotes the flow of wastewater bypassing the tank and ahead of the batch of wastewater that goes into the front of the reactor) ahead of the earlier cascade. This approach of creating selection or deselection differentials based on the physical forces of diffusion is an aspect of the disclosure.

The inventors have discovered an unmet need for a technology solution that can provide improved selection, collection and management of sludge particles in treatment systems and processes that include pumps, mixers and sludge collectors and recycles.

In various embodiments, the combined or series external selection/deselection of particles that have been already internally deselected can substantially improve the overall efficiency and create virtuous cycles for 1) improving settling characteristics, 2) improving thickening characteristics, 3) reducing membrane fouling and increasing flux, 4) improving solids residence time uncoupling to grow fast and slow growing organisms, 5) improving selective reactions by providing specific exposures of sludge particles containing microorganisms to differential priorities of electron donors and acceptors, and 6) improving production of electron donors or acceptors by selecting for internal electron donor (including and not limited to internal or external carbon storage production, or inorganic chemical donors production) or acceptor (such as from photo or chemo reactions to produce oxygen, nitrate, nitrite or other higher oxidation state chemicals) production by microorganisms.

In various embodiments, the approach of selection or deselection 1) improves the growth of desired organisms, 2) improves the overall active fractions of these organisms, and 3) improves resource allocation by these organisms, and 4) improves resource production by these organisms, all within the system. It thus provides for intensification of treatment, resource efficiency for carbon and energy management, and better treatment efficiency. Thus, within the context of an anthropological analogy, one moves from the current hunter gatherer experience of activated sludge process to selective and precision agriculture of the microbial populations contained within the overall activated sludge milieu.

An approach, system, or process, according to the principles of the disclosure, can include, or it can be applied to, a reactor or clarifier having any shape, size or configuration, including, for example, a circular shape, a rectangular shape, a spherical shape, or a semi-spherical shape.

The method and apparatus can apply to any treatment of biological solids in a water or wastewater treatment system where selection or deselection of biological solids is desired to improve treatment.

An approach, system, or process, according to the principles of the disclosure, can include, or it can be applied to, for example, a sequencing batch reactor with an integrated clarification step and/or decanter.

An approach, system, or process, according to the principles of the disclosure, can include, or it can be applied to, for example, a membrane bioreactor.

An approach, system, or process, according to the principles of the disclosure, can include, or it can be applied to, for example, an internal or external deselector that can deselect based on density, size, shear, compression, diffusion, or exposure to light or heat energy.

According one nonlimiting aspect, the disclosure relates to methods and apparatuses involving physical deselection of slow settling particles in a manner to develop a series deselection approach. The concept of multiple deselection by analogy can result in multiple selection as the inverse of one concept could lead to the other. The water or wastewater stream can be subject to a second or multi deselection step or process, which can include, for example, an external selection process that includes density-based or size-based particle selection. In an example embodiment, particles having poor settling characteristics can be selected and output to a waste stream while particles having good settling characteristics can be separated and collected. This serial deselection or out-selection by combining internal and external selection for wasting poor settling particles, filaments or flocs is a salient aspect of the technology solution provided by this disclosure. A similar approach could involve selection based on another physical approach. Any physical approach can be mixed and matched (such as internal diffusion selection and external density selection).

An approach, system, or process, according to the principles of the disclosure, can include, or it can be applied to, for example, a bioreactor comprising an internal lamella followed by a clarifier and an external deselector such as, for example, a hydrocyclone. The lamella can be an internal or external lamella.

The disclosure also relates to methods and apparatus involving a staged approach for collection and management of sludge particles in clarifiers that have, for example, a circular shape, a rectangular shape, a spherical shape, a semispherical shape, or any other shape that a clarifier can be constructed to have. The methods and apparatuses can be configured to select and return good settling particles to a biological process, while selecting and sending poor settling particles to a waste stream.

The series approach improves the efficiency of deselection, while allowing for uncoupling of solids residence times (SRTs) of the poor and good settling particles. This SRT uncoupling allows for slow growing organisms to grow in the good settling particles, which typically are granular. The poorer settling particles can support faster growing organisms. The larger or denser particles can provide resistance to oxygen diffusion and support anoxic or anaerobic conditions, where organisms grow more slowly. The smaller particles or flocs can support growth of faster growing aerobic or anoxic heterotrophic organisms. Multiple deselection can support a plurality of different solids residence times of particle fractions (for example, two, three or more SRTs), including, for example, the lowest solids residence time for organisms subjected to double selection such as with SRT less than 5 days, and moderate solids residence time for organisms subject to only single selection with SRT greater than 5 days. The uncoupling can be devised or controlled as SRT greater or lesser than the average SRT, or calculated as variance or standard deviations from the mean SRT. In this way, all of the organisms are preferably grown and harvested at their appropriate active stage.

According to an aspect of the disclosure, a method and apparatus are provided that include multiple (for example, two, three, or more) different solids residence times (SRTs). The multiple SRTs can be provided by sequencing (or providing in series) two or more methodologies of deselection, with, for example, a fraction with the series deselection having the lowest SRT (for example, 1-5 days), a fraction with a single deselection having a mid SRT (for example, 5-15 days), and a fraction with the most efficiently retained having the longest SRT (for example, 20-100 days), each fraction having a different particle size.

In an embodiment, an approach can have three sludge fractions such as, for example, 1, 4 and 20-days SRTs, respectively, to retain different organisms having different growth rates or preferred redox characteristics. The lowest SRT approach can be focused on biomass observed yield for energy production in sludge processes, while the highest SRT approach can be focused on an autotrophic function such as, for example, nitrification. The middle SRT can be focused on an anoxic function, such as, for example, enhanced biological phosphorus removal under anoxic conditions. These are merely examples, and other approaches are contemplated by this disclosure. According to an aspect, the technology solution can include the production and modulation of SRTs, as well as the number of distinct SRTs that can be provided.

The double deselection (where double anywhere in the disclosure can also refer to multiple) can improve resource allocation or resource production by either improving the use or production of electron donor or acceptor by microorganisms. In this way the appropriate substrate (donor or acceptor) is preferentially fed to the appropriate organisms for resource allocation, or alternatively, the appropriate substrate is produced by the appropriate organisms when exposed to their preferred production conditions. Two conceptual examples are provided, and many additional examples are possible within a broader framework.

In an example, a preferential substrate or diffusion hierarchy of donor or acceptor can be understood by providing the appropriate organism the preferred substrate. For example, using double selection/deselection, nitrifiers are preferentially exposed to oxygen, or via similar means, heterotrophs are preferentially exposed to nitrate as the electron acceptors or otherwise anaerobic conditions. Similarly, heterotrophs may be preferentially exposed to organic carbon and nitrifiers may be preferentially exposed to inorganic carbon or ammonia as their substrate carbon or donor source. Thus any heterotroph or autotrophs may also be preferentially exposed to their electron donors or acceptor using such multiple selection approaches entail. By improving such resource management/allocation of donors and acceptors and their appropriate use with appropriate organisms, much intensification and improved energy management is achieved. Improved treatment is also achieved. For example, a 20-50% volume reduction or a similar reduction in energy use is achieved by such improved resource allocation. Much improved treatment efficiency exceeding 90% removal of desired constituent is also achieved.

The double selection or deselection by means of appropriately repositioning the return streams also allows for variable production of internal electron donor or acceptor. For example, the larger particles in the underflow of a hydrocyclone may facilitate redox conditions and/or promote the growth of slow growing organisms that store substrates (such as polyhydroxyalkanoate or glycogen) that can be relocated to facilitate storage under feast conditions under anaerobic conditions, while autotrophs may be grown in famine conditions where organic substrates are not present or needed and to produce an electron acceptor such as nitrite or nitrate. Thus, the selection or deselection of streams for optimized substrate (donor or acceptor) production when combined with an external size or density selector/deselector such as a hydrocyclone or screen is conceived in this invention. Another approach is to produce either donor or acceptor using a photo source combined with an external selector such as a screen or hydrocyclone (or otherwise any size or density separation device). A photo source could hence select or deselect organisms that favor or disfavor light and thus use these organisms to produce an electron donor (organic carbon) such as with purple bacteria or electron acceptor (such as oxygen) such as with cyanobacteria. The broader category of phototrophs to perform the aforementioned donor or acceptor production, are used to be more inclusive and to comprise any organism that can produce such donors or acceptors at any location or time sequence of a process or in any reactor format. The same could apply to chemotrophs or approaches using a heat source. All of these approaches need electrical energy to help influence the physical selection or deselection. Thus, the combined internal selection/deselection and external selection/deselection of organisms to produce microbially produced electron donor or electron acceptor is also a subject of this invention in a much broader conception of using selectors to produce microbially induced donors or acceptors. The internally produced carbon (from storage and selection/deselection) could satisfy 10-100 percent of the electron donor needs and the internally produced electron acceptor (from such selection/deselection) could also satisfy from 10-100 percent of the electron acceptor needs. We propose a minimum of 20% of donor, acceptor or carbon production through such means. By improving such production of donors and acceptors by appropriate organisms, much intensification and improved energy management is achieved. Improved treatment is also achieved.

There are numerous different types of state-of-the art sludge collectors in use for circular and rectangular clarifiers. These include, for example, physical hoppers and baffles, as well as collectors that use vacuum, airlift, or mechanical means to move sludge to an internal hopper or external sludge box. There exists an opportunity to introduce multiple (for example, two) hoppers, or otherwise use a single hopper to collect the return activated sludge (RAS) and to include, for example, a bottom collector mechanism (for example, a lift or a vacuum) to collect the slowest settling particles found usually at the extremity from the influent supply in, for example, a circular or rectangular clarifier, typically near the periphery of the effluent weir.

The disclosure provides methods and apparatuses that can include the collection of smaller waste flows (for example, compared to an RAS flow), which can be collected separately and directly from, for example, a bioreactor or a clarifier instead of from a combined RAS or mixed liquor flow. This separate and direct collection of waste can allow for a graded approach for collecting the lightest particles using different types of apparatuses, including, for example: one or more suction pipes positioned at a periphery in an organ pipe arrangement; or including separate perforated pipes or plates applied near the periphery (for example, at an extreme end of an influent); or, including moving vacuum sludge collectors that can alternately return sludge to a biological reactor near the influent feed section and waste sludge at the periphery. A waterfall baffle can also be used, where the sludge on the hopper side of a baffle is returned to the bioreactor and the sludge on the outside of the baffle is collected for waste, as needed.

Another approach is to include an internal or external lamella associated with a bioreactor. In an embodiment, the sludge collected can make its way upstream in the bioreactor internal mixed liquor recycle, while the poorer settling particles can be removed in a clarifier, subject at least in part to wasting and deselection. A final approach can include sending the lighter surface waste in the bioreactor to waste and deselection while an underflow of the clarifier can be returned as a recycle stream. Accordingly, internal selection of poor settling particles can be carried out for wasting (referred to as "deselection" or "internal deselection"). The term "out" can indicate that a selection approach occurs to waste material.

In an embodiment of the disclosure, a second (or subsequent) deselection process can be included in the technology solution. The subsequent deselection process can include, for example, an external lamella, hydrocyclone, classifier, centrifuge, upflow separator, or other density-based particle deselector, or otherwise a screen or a filter for a size deselector. The subsequent deselection process can be configured in series with, for example, above-discussed approaches that include density or size-based particle selection. Shear or compression forces can be used to help physically obtain the out-selected particles, where the sheared and compressed particles are out-selected while the particles surviving such shear or compression are retained. Thus, the multi-deselection (for example, double selection) is an aspect of the technology solution.

In an embodiment, the method and apparatus can include an external deselector for physical selection, such as, for example, one or more hydrocyclones or one or more screens, a photo or heat source (including LED or mercury bulb for any wavelength of light including UV, visible or infrared) or a shear mixer.

In an embodiment, the method and apparatus can include an internal deselector for physical deselection, such as, for example, surface wasting for removal of non-desirous filaments and foam causing organisms.

In an embodiment, the wastewater treatment system processes biological solids for water or wastewater treatment, wherein at least one of an internal and an external physical deselection is performed using pressure, flow, heat or light to achieve a physical deselection differential, with a minimum of two or more internal-external deselection steps provided. The internal and external physical deselection steps can include, in series, an internal deselector and a deselector, which can deselect biological solids based on changes in any of density, size, shear-resistance, compressibility, diffusion-characteristics, photo-sensitivity or temperature-sensitivity, and to improve the selective retention of biological solids that are favorable for such the treatment, comprising: (a) a reactor for water or wastewater treatment receiving an influent contaminated water source; (b) a decanter, an integrated or external clarifier, or a membrane separator, or a filter; (c) a first internal selector (or deselector) that deselects the biological solids particles within the reactor, decanter or, clarifier, separator, or the filter, followed by; (d) an external deselector that further removes and deselects particles in series.

In an embodiment, the method and apparatus can bring these two approaches together in an approach of series deselection that involves a combination of internal and external selection. This series approach allows for improved overall deselection efficiency for improved densification, granulation and improvements to sludge volume index and settling velocity. It also allows for a range of particle size or densities to promote internal core redox conditions for slower growing organisms within the inside of these particles or granules that promote or improve function such as for nutrient removal. The approach allows for series SRT uncoupling, allowing for multiple functions from maximizing yield to maximizing treatment function. In embodiments, the method and apparatus can include such ecologically inspired functions promoted by floc or granule formation, calibrated by redox and SRT formulations, and performed by a combination of internal and external selection.

In an embodiment, an internal selection approach (or methodology) can be provided within circular or rectangular clarifiers. The internal selection approach can be configured to include a separate lift or vacuum or an outer hopper, which can be applied at or near a periphery of a clarifier, such as, for example, near an effluent weir, to remove the slower settling particles that drift outwards. The internal selection approach can be further configured to separate the faster settling particles, which can then be returned in the return activated sludge to, for example, a bioreactor. An alternate approach can be to waste at the top of the blanket and return the more compressed sludge at the bottom of the blanket in the return activated sludge.

An embodiment of the disclosure can include clarification-based differential internal selection and a combined internal-plus-external multi-selection approach. The selection and removal (also referred to as deselection or outselection) of poor settling flocs, filaments or particles can be a revolutionary approach for wastewater treatment. It can provide intensification by increasing a total inventory of mixed liquor in a biological process by improving settling and thickening characteristics of liquor. It can also provide intensification by increasing an active inventory of mixed liquor through solids residence time (SRT) uncoupling, allowing for multiple residence times for fast and slow growing organisms. By maintaining the most optimum SRT for organisms based on their growth rate, the overall active mass inventory can be increased. So, multiple (for example, double or triple) deselection with at least the first deselection stage comprising an internal deselector, can facilitate cultivating organisms at their most optimized active fractions within a single process while at the same time exploiting other functional attributes associated with improved densification or particle size that allow for increase in the inventory within the process itself.

In an embodiment, a multi-deselection approach can include starting with an interesting and important congruence that larger sized or denser particles settle well and can increase overall settling velocities. This approach can increase the mass of inventory supported in a system as a first approach. At the same time, the larger or denser particles can offer advantages of promoting multiple redox conditions afforded by mass transfer (diffusion) resistance for oxygen or other electron acceptors to support populations for a treatment function, such as, for example, denitrification or phosphorus removal, as a second approach. Some of the lower redox conditions can support slow growing organisms, which can be retained and not deselected. The ability to support multiple solids residence times from serial deselection can facilitate retention of the larger particles, which, by not being deselected, can become self-agglutinating carriers for such slow growing low redox organisms, as well as slow growing autotrophs that may operate at higher redox conditions. The mid-range particles can support other organisms such as denitrifying phosphorus accumulating organisms that are subject to only a single deselection; and the smaller particles can support heterotrophic organisms that because of double deselection grow fast, have high yield and consequent high energy production within anaerobic digesters. All such organisms can be maintained at their highest active fractions through periodic process control of the deselection process by adjusting the efficiencies of the deselection.

In embodiments, various approaches for internal deselection can be provided, including, for example, with process equipment in operating clarifiers. For example, an internal deselection approach can include a vacuum, an air lift or a pump operation at a top of a blanket to remove the slowest settling particles.

In an embodiment, the internal deselection approach can include an organ pipe arrangement configured to send slower settling particles from a peripheral pipe inlet to a waste line while other pipes are configured to contain sludge that is returned as a recycle stream.

In an embodiment, the internal deselection approach can include a vacuum or a lift arrangement for wasting peripheral sludge near an effluent weir only.

In an embodiment, the internal deselection approach can include one or more waterfall baffles that are configured to retain slow settling organisms in a periphery for deselection. The waterfall baffle can be placed, for example, between about 25% and about 75% of the distance between an inlet and an outlet.

In an embodiment, the internal deselection approach can include a moving vacuum system, which can be manifolded in a manner to waste sludge only when the system reaches the periphery.

In an embodiment, the internal deselection approach can include a system comprising a perforated manifold and one or more plates or pipes in a periphery to collect the slower settling sludge.

In an embodiment, the internal deselection approach can include a system comprising a double hopper with a peripheral hopper included to manage and collect the slower settling organisms. Here, the periphery can be referred to sludge withdrawal away from the influent, for example, at about 50% or greater horizontal distance (for example, measured radially for a circular and along length for a rectangular clarifier) between a clarifier inlet or feed (for example, first feed point in case of multiple feed points) and a clarifier outlet (for example, effluent weir or decanter), preferably greater than about ⅔rd distance, and more preferably greater than 75% distance.

In an embodiment, the internal deselection approach can include a bioreactor and a lamella or surface wasting In an embodiment, the external deselector can include a density, size, shear, compression or viscosity management device that uses physics to impart deselection. The external deselector can include a hydrocyclone, a centrifuge, a classifier, an external lamella or another device that can support external deselection based on density gradients where a lighter fraction can be deselected because of seemingly small specific gravity differences, such as, for example, between about 1.01 and about 1.04, or even as high as 1.10.

In an embodiment, the external deselector can include a screen, a filter or another device that can select or separate particles based on size or compressibility, and that can be used for deselection where, for example, smaller particles are wasted.

In an embodiment, shear can be included in the deselection approach to breakup particles less resistant to shear and have them deselected.

In an embodiment, compression can be included in the deselection approach to remove less rigid particles for deselection such as through its passage through pores in a screen or filter.

In an embodiment, the deselection approach can include a viscosity gradient using a phase separator to remove the more viscous slower flowing particles.

In various embodiments, the internal/external deselection approach can include an internal/external selection approach, and internal/external deselection can include internal/external selection.

In various embodiments, the internal/external selection approach can include an internal/external deselection approach, and internal/external selection can include internal/external deselection. For internal deselection or selection, the approach can occur from the physical use of an inlet pipe, an outlet pipe, connected to a pump, or the use of a source of energy or electrons being donated or accepted, thereof.

In certain embodiments, the deselection approach can include external selection or deselection in combination with internal selection or deselection is of interest. These approaches can be configured in a series arrangement, wherein, for example, an output of one deselection approach is supplied to an input of the other deselection approach, thereby providing multi-deselection, or double deselection in this example. Additional deselection stages can be added in series to provide triple deselection, or greater than triple deselection.

The disclosure provides a multi-deselection approach that can increase SRT uncoupling by a factor ranging from approximately two (2) to five (5) times, or greater, for denser or larger size fraction relative to the lighter and smaller particles for a single deselection approach. For double deselection, the SRT uncoupling is about double the single deselection range, and from about four (4) to about ten (10) times for denser or larger size fraction relative to the lighter and smaller particles. The template particle morphology for dense or large particle is a granule and the template particle morphology for a light and small particle is a floc. Double deselection can better retain slow growing organisms on one end of the spectrum, and washout fast growing organisms on the other end of the spectrum continuum. In a preferred embodiment, the multi-deselection approach can host multiple (for example, two or more SRT uncoupled) organism groups in their most appropriate mass fractions for most effective treatment, referred to as "active inventory."

The present disclosure provides, in certain embodiments, an SRT uncoupling approach that can include an internal deselection approach performed within, for example, a reactor or clarifier, and an external deselection approach performed using a size or density selector.

In certain embodiments, the external deselection approach can provide a Sludge Volume Index (SVI) of less than 100 mL/g (SVI<100 mL/g), and the multi-deselection approach, which also includes the internal deselection approach, can provide an SVI of less than 80 mL/g (SVI<80 mL/g).

The multi-deselection approach can be applied to, or included with, any type of activated sludge reactor, including, for example, a bioreactor and a clarifier, a sequencing batch reactor, a modified sequencing batch reactor, an integrated fixed film activated sludge reactor, an upflow reactor with integrated clarifier or decanter, or a membrane bioreactor. Fixed, moving or mobile media as biofilms can be used if desired in any reactor configuration. The modified sequencing batch reactor can include a single or multiple reactor tanks in series, in a step feed configuration, with at least two sequenced clarifiers. The upflow reactor can include feed piping located at the bottom of the reactor with an integrated clarifier or decanter at the top of the reactor. In the figures, if an inlet or outlet is not explicitly shown for a reactor or a clarifier, it needs to be assumed to have such inlet or outlet. The purpose of the figure is to show the key embodiment for performing selection.

FIG. 1 depicts an embodiment of a clarifier 100, with an internal deselection approach that comprises a physical deselector having an internal selection vector 103, according to the principles of the disclosure. The clarifier 100 includes an inlet pipe or channel 101, which can be configured to receive a solid-liquid mixture containing soluble organic and inorganic contaminants and particulate materials from a reactor using 108, and send material from 102 back to the reactor. The vector 103 can include an extraction system (not shown) comprising, for example, a vacuum or a pump that removes the lighter material in the periphery of the clarifier 100, which can then be output to be wasted.

Any of the various embodiments of the internal selection approach discussed below can include a physical deselector 109 that is included internally in a reactor (for example, reactor 750, shown in FIG. 7) or external to the reactor, or internally in the clarifier 100 or external to the clarifier 100. The physical deselector 109 can comprise one or more pipes, one or more plates, a baffle, a manifold, a slotted manifold, a perforated manifold, a pump, a vacuum, a heat source, a gas source, a pressure source, a mixing source, a cooling device, an electromagnetic energy source (including, for example, infrared, visible, and ultraviolet wavelengths), a motor, a drive, a filter, a membrane, a clarifier, a centrifuge, a cyclone, a hydrocyclone, a tank, a reactor, or any combination thereof. The selector can be configured to perform any of the various embodiments of internal approaches disclosed or contemplated by this disclosure, including performing the various vectors disclosed herein, including vectors 103, 201-204, 304, 403, 503, and 603 discussed below. The physical selector 109 can include, for example, the energy source 1204 (shown in FIG. 12).

The selector can be configured to perform an internal selection (or deselection) approach by, for example, using a negative or positive pressure at or near a reactor interface or clarifier interface. The internal selection approach can, for example, be performed: at a surface of the reactor or surface of a settling blanket; at a periphery of the clarifier; using slotted or perforated manifolds, plates or pipes that are placed near the periphery; using a baffle that directs and separates sludge at the periphery; at a feed zone for influent or recycles addition; or at a discharge zone for effluent or recycles.

In various embodiments, the selector can include an energy source provided in the reactor (for example, reactor 750, shown in FIG. 7) that provides energy to deselect/select particles, including biological solids, from a liquid-solid mixture. The energy source can include, for example, an electromagnetic energy source (visible light, ultraviolet light, or infrared), a heat source, a gas source (for example, oxygen, air, nitrogen, etc.), a pressure source (for example, pump or vacuum), and a mixing source (for example, mixer, motor, etc.).

In various embodiments, the selector can be configured to separate lighter or less dense particles that occur at the surface of a solids blanket or away from the clarifier influent at the periphery. The selector can include negative or positive pressure, for example, using a vacuum, lift or pump mechanism that is applied either directly to the sludge, or include collectors such as, for example, perforated or slotted pipes, plates or manifolds, or baffles to direct or separate two or more sludge withdrawals or rake arms that assist in collecting at least one of two or more sludge withdrawals.

The internal deselection approach can be applied at a periphery of the clarifier 100, away from the inlet piping or channel 101, and nearer to the effluent weir or decanter (not shown) where poorer settling sludge will tend to migrate and settle. The internal deselection approach can have, for example, the internal selection vector 103 depicted in FIG. 1. A return activated sludge (RAS) 102 can be collected from an underflow outlet or hopper of the clarifier 100. The RAS 102 can be collected and supplied to a return activated sludge (RAS) box (not shown) or returned as a recycle stream to an input of, for example, the clarifier 100, a reactor (not shown), or another stage of a wastewater treatment process or system (not shown). The pipe or channel 108 can receive flow from a flow source 105. In various embodiments, the flow source 105 can include a reactor, which can be configured to receive flow of influent wastewater or primary effluent.

In an embodiment, the flow source 105 includes optional combinations of the following: a pretreatment system (not shown) that is configured to receive wastewater from a sewage system (not shown) and process the wastewater in one or more pretreatment stages, including, for example, a bar screen (not shown) configured to remove larger objects such as cans, rags, sticks, plastic packets, and the like, from the wastewater; a pre-treatment chamber (not shown) containing, for example, a sand or grit chamber or channel configured to adjust a velocity of the incoming wastewater and thereby allow the settlement of, for example, sand, grit, stones, broken glass, and the like; a tank for removal of, for example, fat, grease, and the like; or a primary separator, such as, for example, a clarifier tank, or a sediment tank, for gravity settling. The primary separator can include a chemical or ballast material that is added to improve solids removal. Downstream of the separator is a process or reactor often called an activated sludge process. The clarifier is comprised of this process. The resultant solid-liquid mixture containing soluble organic and inorganic contaminants and particulate materials can be output from the reactor (in the flow source 105) and fed, directly or indirectly, via outlet 108 to the inlet pipe or channel 101 as influent into the clarifier 100. The lighter or poorly settling material is typically at the top or periphery of the blanket and is removed by the vector 103.

Although illustrated as having a circular shape in the embodiments depicted in the figures, the clarifier 100 can have any shape, including, for example, a rectangular shape, a cone shape, a cylindrical shape, an elliptical shape, a spherical shape, or a semi-spherical shape.

Figure 2:
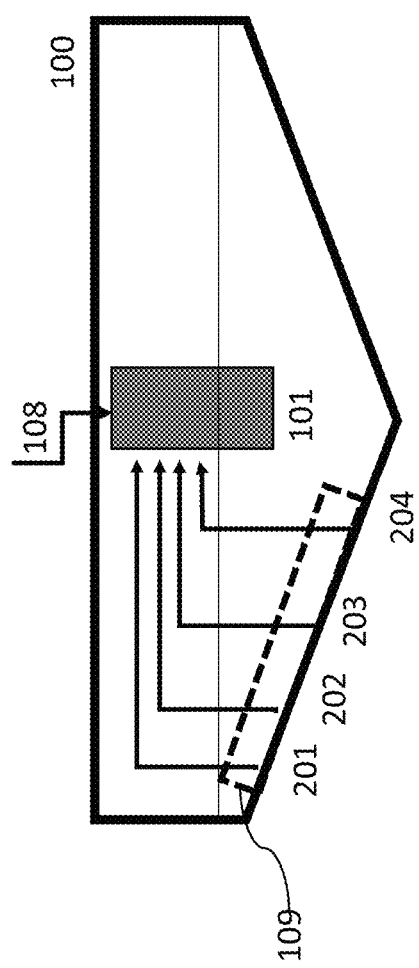
FIG. 2 depicts an embodiment of an internal selection approach in an organ pipe clarifier.

FIG. 2 depicts an embodiment of an internal selection approach comprising an internal selector, in which the clarifier 100 comprises an organ pipe clarifier. In this embodiment, the clarifier 100 can include a selector 109 comprising multiple pipes, each of which can be configured to lift sludge from near the bottom of the clarifier 100 and direct the lifted sludge in the clarifier 100 away from the bottom, according to, for example, selection vectors 201, 202, 203, and 204. The multiple pipes can be configured to facilitate multiple internal selection vectors, such as, for example, the internal selection vectors 201, 202, 203, 204 depicted in FIG. 2. The pipes can be configured to supply the sludge into a return activated sludge (RAS) box (not shown).

In an embodiment, the clarifier 100 includes an underflow outlet (not shown) at which RAS can be collected. The RAS can be collected and supplied to a RAS box (for example, chamber 900, shown in FIG. 9) or returned as a recycle stream to an input of, for example, the clarifier 100, a reactor (not shown), or another stage of a wastewater treatment process or system (not shown).

The clarifier 100 can be configured to receive a solid-liquid mixture from, for example, the outlet 108 from the flow source 105 (shown in FIG. 1). The peripheral pipes can each be located away from the inlet 101. Any one or more of the pipes can be configured to collect sludge near the bottom of the clarifier 100 and send the collected sludge to solids handling (not shown) or waste (not shown), for example, in a waste stream.

The internal deselection approach depicted in FIG. 2 associated with the organ pipes can include one or more vacuums or pumps. The lighter or poorly settling material is typically at the top or periphery of the blanket and can be removed by the vector 201. The vectors 202, 203, and 204 can be configured to remove the lighter or poorly settling material downward of, or along a periphery of the blanket. In an embodiment, the vector 201 can remove material at the top or periphery of the blanket; the vector 202 can be configured to either remove or return sludge to the reactor; the vector 203 can be configured to remove or return sludge to the reactor; and, the vector 204 can be configured to remove or return sludge to the reactor.

Figure 3:
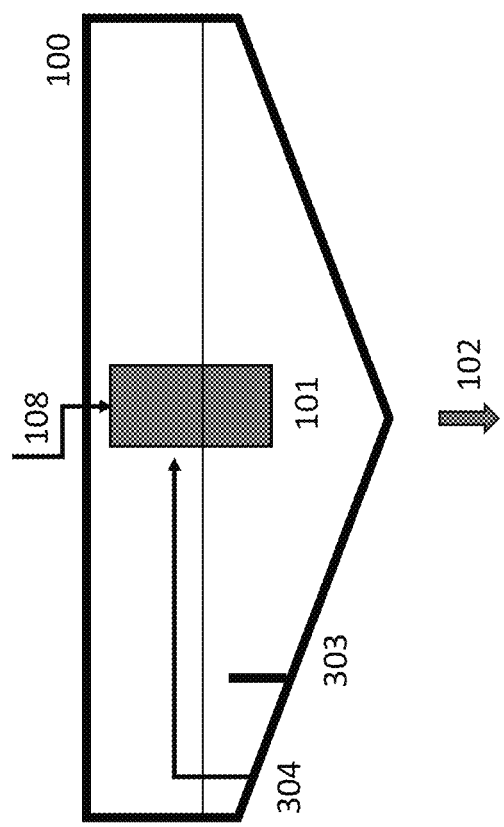
FIG. 3 depicts an embodiment of an internal selection at a clarifier periphery mediated by a waterfall baffle.

FIG. 3 depicts an embodiment of an internal deselection approach that includes an internal selector, wherein the approach includes a clarifier 100 having a waterfall baffle 303. The clarifier 100 can be supplied, via the inlet 101, with the solid-liquid mixture 108. The internal deselection approach can include an internal selection vector 304 at a periphery of the clarifier 100, away from the inlet 101. The internal selection vector 304 can be mediated by the waterfall baffle 303. The waterfall baffle 303 can be applied to direct sludge flow to a hopper (not shown) or an underflow at which the RAS (return activated sludge) 102 can be collected. The internal selection vector 304 can be applied to direct sludge leeward of the baffle 303 to a separate sludge collector (not shown) for solids handling or wasting.

The RAS 102 can be collected and supplied to a return activated sludge (RAS) box (not shown) or returned as a recycle stream to an input of, for example, the clarifier 100, a reactor (not shown), or another stage of a wastewater treatment process or system (not shown). The lighter or poorly settling material is typically at the top or periphery of the blanket and is removed by the vector 304.

Figure 4:
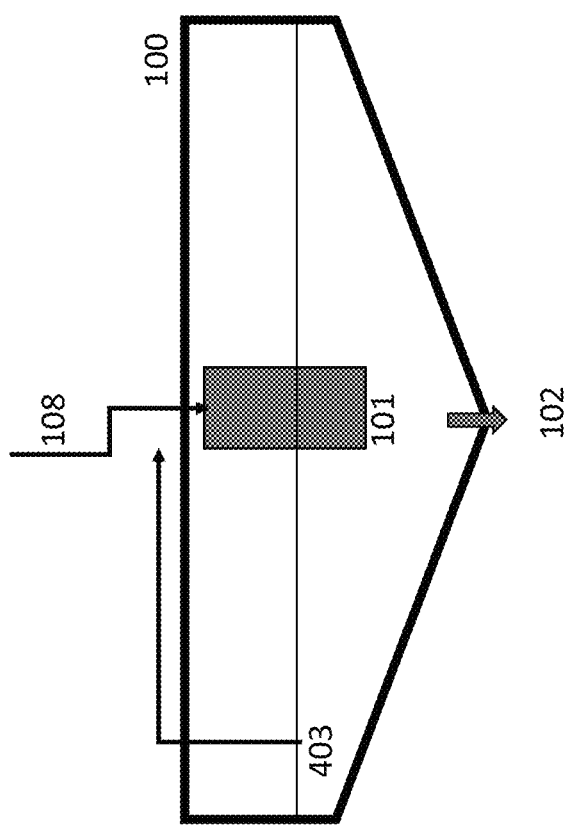
FIG. 4 depicts an embodiment of an internal selection approach at a top of a blanket.

FIG. 4 depicts an embodiment of an internal deselection approach in which the clarifier 100 comprises a blanket. The clarifier 100 can include a deep clarifier, such as, for example, greater than ten feet (10 ft.) in depth and that can support a blanket. Here, the internal deselection approach can be configured such that the sludge from the top one-third, or less, and preferably the top 25%, of the blanket can be partly used to supply deselected solids. The internal deselection approach can include an internal selection vector 403, as depicted, that can be applied to the blanket to supply the deselected solids.

The clarifier 100 can be supplied, via the inlet 101, with the solid-liquid mixture 108. The RAS 102 can be collected from an underflow outlet or hopper of the clarifier 100. The RAS 102 can be collected and supplied to the RAS box (for example, chamber 900, shown in FIG. 9) or returned as a recycle stream to an input of, for example, the clarifier 100, a reactor (for example, in the flow source 105, shown in FIG. 1), or another stage of a wastewater treatment process or system (not shown).

In various embodiments, the clarifier 100 can include a sequencing batch reactor or an upflow reactor with an integrated clarification or decanting step. The lighter or poorer settling material is typically at the top of the blanket of the reactor or clarifier and is removed by the vector 403.

Figure 5:
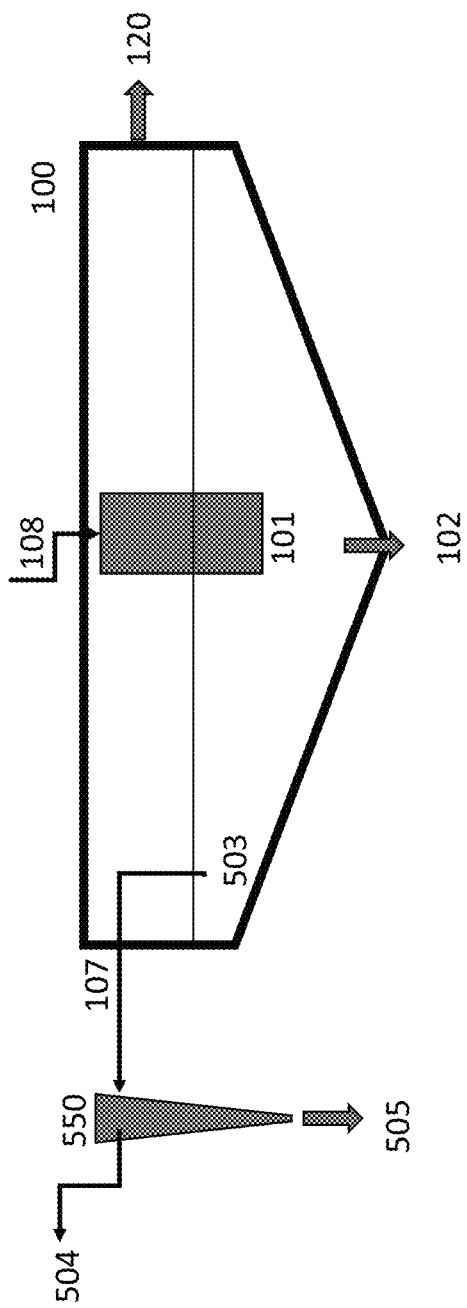
FIG. 5 depicts an embodiment of an internal selection approach followed by an external selection approach that includes a hydrocyclone-based density separation approach.

FIG. 5 depicts an embodiment of a multi-deselection approach comprising the clarifier 100 with an internal deselection approach, including an internal selector, and a density-based (DB) deselector 550 with an external deselection approach. The clarifier 100 can include a waste outlet 107 coupled to an input of the DB deselector 550. The clarifier 100 can be supplied, via the inlet 101, with the solid-liquid mixture 108. The clarifier 100 can include an output 120. In an embodiment, the clarifier 100 includes an internal deselection approach that can include an internal selection vector 503 using and aforementioned internal deselection approaches. The internal deselection approach can be included in a periphery of the clarifier 100, away from the inlet 101. The lighter and poorer settling material is typically at the top or periphery of the blanket and is removed by the relevant vectors to the DB.

In certain embodiments, the internal deselection approach (in FIG. 5) can include one or more internal selection vectors, including, for example, internal selection vectors 103, 201-204, 304, 403, or 503 discussed above.

The DB deselector 550 can include, for example, a hydrocyclone, a centrifuge, a lamella, a classifier, a screen, a filter, or any compact device capable of density-based particle selection. The DB deselector 550 can include, for example, the gravimetric selector 11 described in U.S. Pat. No. 9,242,882, titled "Method and Apparatus for Wastewater Treatment Using Gravimetric Selection," or the gravimetric selector 260 described in U.S. Pat. No. 9,670,083, titled "Method and Apparatus for Wastewater Treatment Using External Selection," both of which are hereby incorporated herein by this reference in their entireties.

The DB deselector 550 can be configured to receive the solid-liquid mixture from the clarifier 500, via the outlet 107, and carry out an external deselection approach comprising classifying, separating or sorting solids/particles in the solid-liquid mixture based on density of the solids/particles compared to the rest of the solids/particles in the mixture. The DB deselector 550 can be configured to separate densified solids/particles that tend to exhibit good settling characteristics from less dense solids/particles that tend to exhibit poor settling characteristics.

The DB deselector 550 can be configured to output the densified solids/particles at a recycle stream output 505 as an underflow, which can then be fed back to the clarifier 100, a reactor (not shown) or another stage of a wastewater treatment process for further processing, including, for example, bioreaction or digestion. The DB deselector 550 can be configured to output the remainder of the received solid-liquid mixture at its waste stream output 504, which can contain smaller particles and colloids that have the potential to cause membrane bioreactor (MBR) membrane fouling, cause turbidity in effluent, or induce membrane air diffuser fouling.

The RAS 102 can be collected from an underflow outlet or hopper of the clarifier 100. The RAS 102 can be collected and supplied to a RAS box (for example, chamber 900, shown in FIG. 9) or returned as a recycle stream to an input of, for example, the clarifier 100, a reactor (not shown), or another stage of the wastewater treatment process or system (not shown).

In an embodiment, the internal deselection approach depicted in FIG. 5 removes the lighter or poorer settling material that is typically at the top or periphery of the blanket and is removed via a pump (not shown) by the vector 503 and then exposed to further deselection and wasted via 504. In an embodiment, the lighter or poorer settling material can be removed via the pump (not shown) or a vacuum (not shown) by the vector 503 and wasted via the outlet 120.

Figure 6:
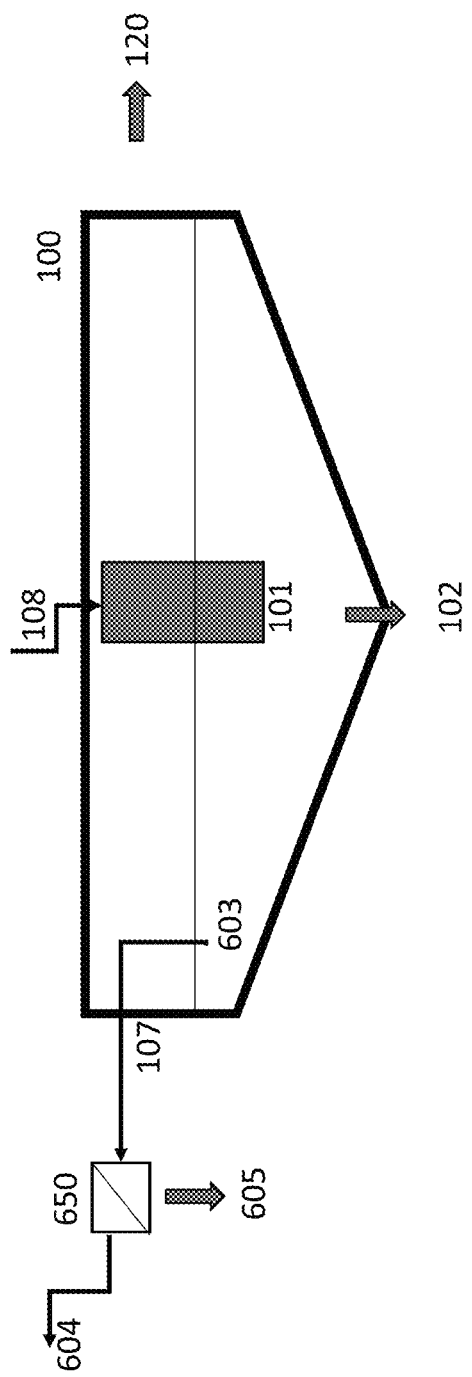
FIG. 6 depicts an embodiment of an internal selection approach followed by an external selection approach that includes a screen- or filter-based separation approach.

FIG. 6 depicts an embodiment of a multi-deselection approach comprising the clarifier 100 with an internal deselection approach, including an internal selector, and a particle size-compressibility (PSC) deselector 650 with an external deselection approach, according to the principles of the disclosure. The clarifier 100 can include the inlet 101 and the internal deselector outlet 107, which can be coupled to an input of the PSC deselector 650. The clarifier 100 can be supplied, via the inlet 101, with the solid-liquid mixture 108 and output, via outlet 107, a processed solid-liquid mixture to the PSC deselector 650. The internal deselection approach can include an internal selection vector 603. The internal deselection approach can be included in a periphery of the clarifier 100, away from the inlet 101.

In certain embodiments, the internal deselection approach (in FIG. 6) can include one or more internal deselection vectors, including, for example, internal selection vectors 103, 201-204, 304, 403, 503, or 603 discussed above.

The PSC deselector 650 can include, for example, a screen, a filter, a membrane or a device capable of separating particles based on size or compressibility or resistance to shear of the particles compared to the rest of the particles in the solid-liquid mixture received from the outlet 607. The PSC deselector 650 can include a mesh or a non-mesh structure, and can be a drum, stationary, band or vibrating device, as will be understood by those skilled in the art. The PSC deselector 650 can include the gravimetric selector 260 or membrane apparatus 10 described in U.S. Pat. No. 9,670,083, which has been incorporated herein by reference in its entirety. The PSC deselector 650 can include an optional screen wash, such as the screen wash 5 described in U.S. Pat. No. 9,670,083, to further assist in a screening process.

The PSC deselector 650 can be configured to receive the solid-liquid mixture from the clarifier 100, via the outlet 107, and separate recyclable solids from the rest of the received solid-liquid mixture based on size and compressibility of the solids/particles in the mixture. The typical ranges of size for selection can range from as low as 10 microns to as high as 1000 microns. However, the preferred range is between 200-500 microns. Any value between 10 and 1000 microns are herewith disclosed as possible. The portion of the solid-liquid mixture that passes through the PSC deselector 650, for example, waste constituents, can be output as a waste stream to at a waste outlet 604 as a deselected portion; and, the solids/particles that are retained by the PSC selected 650 can be output to a return outlet 605, which can be returned, for example, to a bioreactor (not shown) or another stage of a wastewater treatment process for further processing, including, for example, bioreaction or digestion to a bioreactor (not shown).

The RAS 102 can be collected from an underflow outlet or hopper of the clarifier 100. The RAS 102 can be collected and supplied to a RAS box (for example, chamber 900, shown in FIG. 9) or returned as a recycle stream to an input of, for example, the clarifier 100, a reactor (not shown), or another stage of the wastewater treatment process or system (not shown).

The internal deselection approach depicted in FIG. 6 can include a pump (not shown) or a vacuum (not shown) that removes the lighter or less settleable material that is typically at the top or periphery of the blanket and is removed by the vector 603.

Figure 7:
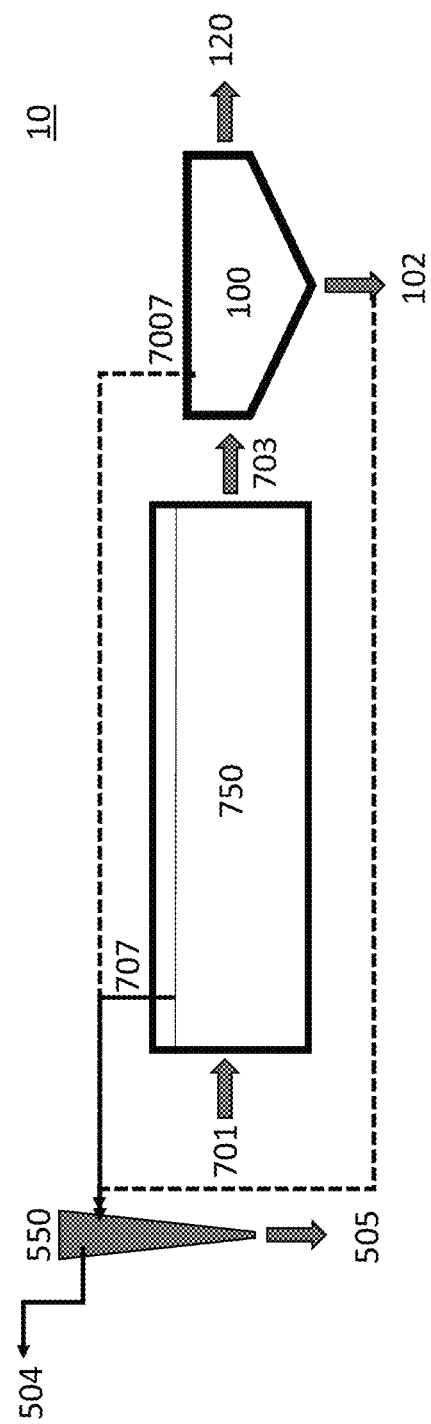
FIG. 7 depicts an embodiment of an internal selection approach in a bioreactor, including surface wasting, followed by an external selection that includes a hydrocyclone-based density separation approach.

FIG. 7 depicts an embodiment of a wastewater treatment system 10 comprising a multi-deselection approach, according to the principles of the disclosure. The system 10 includes the clarifier 100 with an internal deselection approach, a reactor 750 and the DB deselector 550 with the external deselection approach. The system 10 can be configured to receive an influent 701 at an input of the reactor 750. The influent 701 can contain a solid-liquid mixture containing soluble organic and inorganic contaminants and particulate materials. The influent 701 can be received from an external source (not shown), such as, for example, the flow source 105 (shown in FIG. 1). For instance, the input of the reactor 750 can be coupled, directly or indirectly, to the outlet 108 of the flow source 105.

In an embodiment, the flow source 105 (shown in FIG. 1) includes the reactor 750.

The reactor 750 can include a bioreactor, a membrane bioreactor (MBR), a moving bed bioreactor (MBBR), a fixed-bed reactor, an electro-biochemical reactor (EBR), a hollow fiber bioreactor, a membrane biofilm reactor, a batch reactor, a fed batch reactor, a continuous reactor, a continuous stirred-tank reactor, a plug flow reactor or a device or system that can support a biologically active environment. The reactor 750 can be configured to carry out a treatment process, such as, for example, a suspended growth activated sludge process, a granular process, an integrated fixed-film activated sludge process, a biological nutrient removal process, an aerobic digestion process, or an anaerobic digestion process.

The reactor 750 can be configured for surface wasting of the biologically active mixture at an output 707 of the reactor 750, which can be supplied to an input of the DB deselector 550. In an embodiment, the clarifier 100 can be configured for surface wasting (of the blanket) of the mixture at output 7007 of the clarifier 100. The DB deselector 550 can, via an external deselection approach comprising density-based separation, separate densified solids/particles from the surface wasted mixture and output the densified solids/particles at the recycle stream output 505, which can then be returned to the reactor 750, the clarifier 100, or another stage of a wastewater treatment process for further processing, including, for example, bioreaction or digestion. The DB deselector 550 can output the remainder of the surface wasted solid-liquid mixture, which has been double deselected, at the waste stream output 504, which can contain smaller particles and colloids that have the potential to cause MBR membrane fouling (if membrane system is in lieu of a clarifier), cause turbidity in effluent, or induce membrane air diffuser fouling.

The clarifier 100 can apply an internal deselection approach, which can include, for example, one or more of the internal selection vectors 103, 201-204, 304, 403, 503, or 603 discussed above.

The clarifier 100 can be configured to receive a solid-liquid mixture from an output of the reactor 750, apply the internal deselection approach and separate the solid-liquid mixture according to the internal deselection approach to output the RAS 102 and the clarifier output 120. In various embodiments, this clarifier output 120 can be included in any aforementioned clarifier in previous figures not showing such output. A portion of the RAS 102 can be combined with the surface waste 707 if, for example, 707 is insufficient in quantity or too thin in concentration. A ratio of between 10% RAS (702) and 90% surface waste (707) to 90% RAS (102) and 10% surface waste (707) is possible. 100% surface waste (707) is also possible.

In an embodiment, the RAS 102 is collected from the underflow outlet or hopper of the clarifier 100. The RAS 102 can be collected and supplied to a RAS box (for example, chamber 900, shown in FIG. 9) or returned as a recycle stream to an input of, for example, the reactor 750, clarifier 100, the DB deselector 550, or another stage of the wastewater treatment process or system (not shown).

As discussed above, the embodiment of the wastewater treatment system 10 comprises the multi-deselection approach of the internal deselection approach applied in the reactor 750 and the external deselection approach applied in the DB deselector 550. As depicted in FIG. 7, the multi-deselection approach includes the external deselection approach in the DB deselector 550 arranged in series with, and after, the internal deselection approach in the reactor 750. Other multi-deselection approaches are contemplated by this disclosure, including, for example, combinations of, but not limited to, peripheral approaches, other density separation approaches, size separation approaches, shear-based separation approaches or compression-based separation or combination approaches.

In an embodiment of the wastewater treatment system 10, the recycle stream 505 and RAS 102 can be supplied in return lines to two different locations in the reactor 750, such as with the return line from 505 preceding the RAS 102 to thus send specific organisms contained in the line 505 relative to the RAS 102 to specific donors or acceptors. For example, the larger and/or denser materials in line 505 and/or RAS line 702 can be sent to a feast zone (not shown) in the reactor 750, while the smaller or less dense fraction in line 505 and/or RAS line 102 can be sent directly to an anoxic tank (not shown) in an anaerobic-anoxic-aerobic (A2O) process approach. The vice versa is also possible, as needed.

Figure 8:
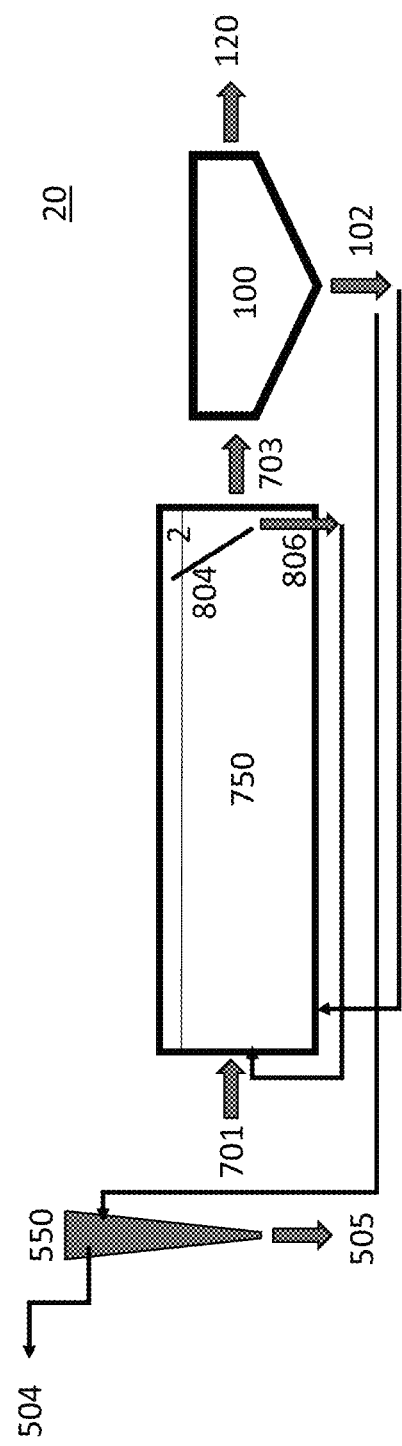
FIG. 8 depicts an embodiment of an internal selection approach in a bioreactor, including an internal lamella, followed by a clarifier and an external selection that includes a hydrocyclone-based density separation approach.

FIG. 8 depicts an embodiment of a wastewater treatment system 20 comprising a multi-deselection approach, according to the principles of the disclosure. The wastewater treatment system 20 can include the clarifier 100, reactor 750 and DB deselector 550, as depicted. The reactor 750 can include an internal lamella 2. In an embodiment, the reactor 750 can include a decanter. The multi-deselection approach, in the system 20, includes an internal deselection approach in the reactor 750 followed by the clarifier 100 with outlet 120 and RAS 102, followed by an external deselection approach in the DB deselector 550 with an underflow 505 returned to the reactor 750 and the deselected overflow 504 output, for example, as a waste stream.

In an embodiment, the system 20 can include an external lamella or decanter in place of, or in addition to the lamella (or decanter) 2. An underflow of the lamella or the non-decanted material 804 containing larger or denser material is retained, or returned in a mixed liquor recycle 806, while the lamella or decanter contained stream is sent, via the outlet 703, to the clarifier 100 for settling, additional return, and wasting either from a common hopper or using peripheral or blanket surface removal approaches, discussed above. The external deselection approach can include density-based selection in the case of the DB deselector 550. This approach also enhances densification for improved settling or thickening properties.

In certain embodiments, the PSC deselector 650 (shown in FIG. 6) can be included in addition to, or in place of, the DB deselector 550. In such embodiments, the external deselection approach can include density, size, shear or compression, or any combination thereof in separating process-promoting material comprising densified or larger solids/particles or granules from non-process-promoting material comprising less dense or smaller or less compressible solids or particles. Process-promotion material can include, for example, growth activated granules or material that can promote or facilitate growth of one or more classes of microorganisms that can facilitate bioreaction, biodigestion or biological selection in the reactor 750. These processes can be characterized by biomass with a higher density and particle size than, for example, flocculent biomass.

In certain embodiments, the system 20 can include an external lamella, a high-rate clarifier with optional multiple withdrawals, weir, or decanter. The system 20 can include a surface waste device in lieu of the internal lamella 2. The effluent from such a device can be directly wasted and/or sent to the clarifier 100 for return or wasting.

In an embodiment of the wastewater treatment system 20, the recycle stream 505 and the RAS 102 can be supplied in return lines to two different locations in the reactor 750. For example, the larger and/or denser materials in line 505 and/or RAS line 102 can be sent to a feast selector zone (not shown) in the reactor 750, while the smaller or less dense fraction in line 505 and/or RAS line 102 can be sent directly to an anoxic tank (not shown) in an anaerobic-anoxic-aerobic (A2O) process approach. The vice versa is also possible, as needed. This approach helps improve either resource allocation or resource production for and by the microorganism in the sludge as previously discussed. This approach also enhances densification for improved settling or thickening properties.

In an embodiment, the wastewater treatment system 20 can include an internal selection approach comprising the bioreactor 750 using an internal lamella 2 or an external lamella (not shown) as part of the reactor, or between the reactor 750 and a clarifier (not shown), followed by the clarifier 100, with the outlet 120 and RAS 102, followed by external selection DB 550 (for example, using hydrocyclone-based density separation) with the underflow 505 returned to the bioreactor 750. The internal recycle 806 in the reactor 750 can return the heavier settled fraction upstream of the RAS 102. In this approach, an external lamella or decanter is also possible.

The underflow of the lamella 2 can include the non-decanted material 806 containing larger or denser material, which can be retained, or returned in a mixed liquor recycle, while the lamella or decanter contained stream is sent, via 703, to the clarifier 100 for settling, additional return, and wasting either from a common hopper or using aforementioned peripheral or blanket surface removal approaches.

The external separation, for example, DB deselector (550), can be density, size, shear or compression or combination aforementioned approaches. In an embodiment, the principle of deselection can be used to develop multiple niches of particles exposed to different SRTs, electron donors or acceptors. The three return streams 505, 806 and 102 can comprise ratios of different organism groups and can be then exposed to different donors or acceptors or carbon sources or quantities within the reactor. This approach also enhances densification for improved settling or thickening properties.

Figure 9:
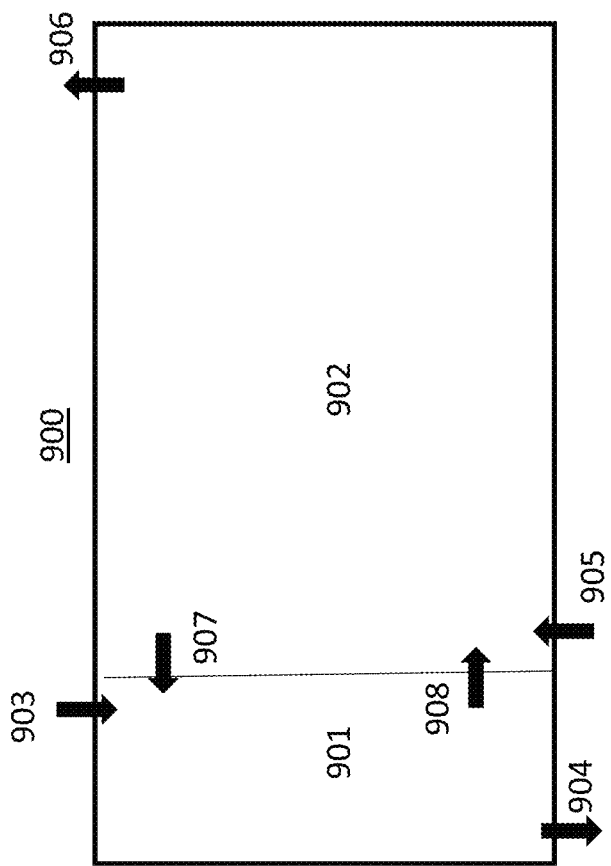
FIG. 9 depicts an embodiment of a chamber that can be included to manage a single return activated sludge (RAS), or multiple RAS, and/or one or more waste activated sludge (WAS) flows and their disposition.

FIG. 9 depicts an embodiment of a chamber 900 constructed according to the principles of the disclosure. The chamber 900 can include, for example, a box chamber, a tank chamber or a wet well chamber. The chamber 900 can be divided into at least 2 compartments 901 and 902, each of which can be configured to collect waste activated sludge (WAS) and return activated sludge (RAS), respectively. A waste activated sludge stream (WAS stream) can be received at an input 903 and output at an outlet (or output) 904 of the compartment 901. A return activated sludge stream (RAS stream) can be received at an input 905 and output at an outlet (or output) 906 of the compartment 902. An interchange, 907 and 908, can be created between the two compartments, 901 and 902, which can manage variables in the WAS and RAS such as, for example, solids concentration, flow, or the mass that leaves the chamber 900 in the form of WAS or RAS. The interchange, 907 and 908, can adjust the variable in a manner that can maintain the SRTs of different fractions.

The chamber 900 can include, for example, one or more sensors (not shown) or probes (not shown). In an embodiment, the chamber 900 can include a sensor device (not shown) comprising, for example, a TSS (total suspended solids) probe, a viscosity probe, a density or size measurement sensor (for example, using acoustics).

In an embodiment, the chamber 900 can include an overflow weir (not shown). The RAS and WAS can be separated by the overflow weir if needed to decant the contents.

In certain embodiments, the chamber 900 can be included in a multi-deselection approach such as, for example, depicted in FIG. 7 or 8. The chamber 900 can be placed in between the internal deselection approach comprising, for example, the clarifier 100 and/or reactor 750 (shown in FIGS. 7 and 8) and the external deselection approach comprising, for example, the DB deselector 550 (shown in FIGS. 7 and 8) and/or the PSC deselector 650 (shown in FIG. 6).

In an embodiment, the chamber 900 can be placed downstream of the external deselection approach (for example, DB deselector 550 and/or PSC deselector 650), such as, for example, to help manage or tune, not only the splits, but also the variables of concentration, flow and mass themselves, as well as the fractions associated with the different SRTs for these variables.

Figure 10:
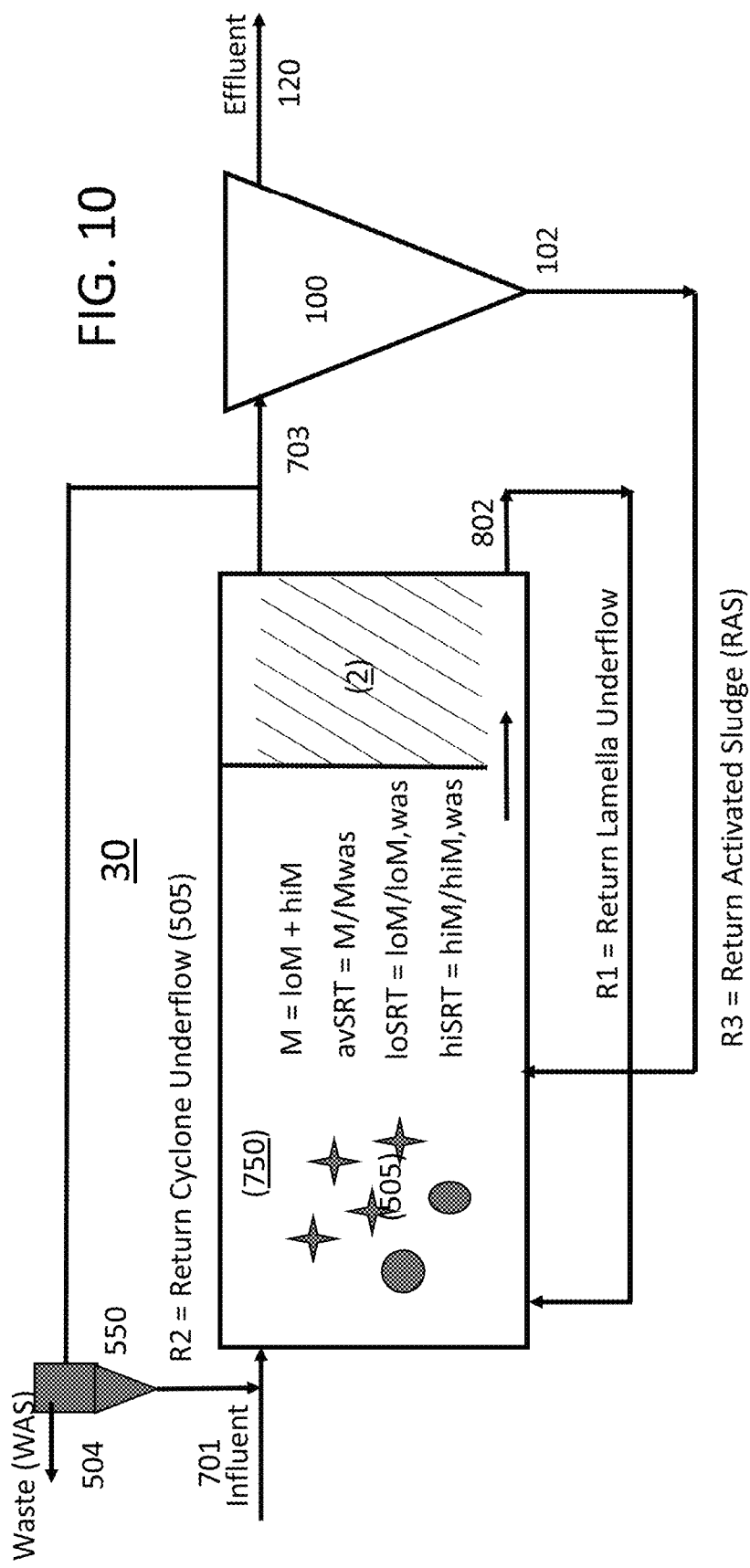
FIG. 10 depicts an embodiment of a double deselection process and system.

FIG. 10 depicts an embodiment of a double deselection approach in a wastewater treatment system 30, constructed according to the principles of the disclosure. Similar to the embodiment depicted in FIG. 8, the system 30 comprises the clarifier 100, the reactor 750 (including lamella clarifier 2) and the DB deselector 550. In an alternative embodiment, the system 30 can include the PSC deselector 650 in place of, or in addition to, the DB deselector 550.

As depicted, the double deselection approach can be applied to a biomass material as the material travels and passes through multiple consecutive physical deselectors, which in this embodiment is three physical deselectors. The selection efficiency of the first selector (for example, the lamella clarifier 2) can be about 70% of the heavier granular fraction and about 50% of the lighter flocculent fraction which get retained and recycled to the reactor 750 as RAS R1 (802). From the other portion, a side-stream gets separated and is sent to a second selector (for example, the DB deselector 550) with a selection efficiency of about 80% for granules and about 25% for flocs returning in the RAS R2 (505) to the reactor 750 and the residual portion is wasted (for example, WAS output 504).

The main-stream continues from the first selector (for example, lamella clarifier 2) to a third selector (for example, the clarifier 100), for which an ideally complete solids-retention can be assumed with the underflow RAS R3 (102) recycled to the reactor 750. An additional assumption can be applied, that the average retention of solids in the system amounts to 10 days, which means that 10% of the total mass gets wasted every day. The fractions of granules and flocs in this waste-mass can be calculated by applying the assumed selection efficiencies of the consecutive selectors as shown in the calculations below. The retention time for the granular fraction can be calculated from the ratio of the total granular mass by the daily wasted mass of granules resulting in 45 days compared to only 7 days for the flocculant fraction. Obviously, the flocs need to grow faster to compensate for the higher waste-rate. This approach also enhances densification for improved settling or thickening properties.

In order to evaluate the impact of the lamella-clarifier 2, the selection-efficiency of the lamella can be set to zero while the other selectors are kept unchanged. A repetition of the calculation assuming the same average SRT and the same sludge composition in the reactor leads to a substantially lower SRT for the granules of 28 days compared to 8 days for flocs. In one embodiment, R2 is sent to a different location from R1 and R3 allowing for different approaches for resource allocation and resource production. In general, the heavier material is preferentially sent ahead of the lighter material, thus in the case of the embodiment(s) depicted in FIG. 10, R2 (the heaviest material selected in the underflow)

is sent ahead of R1 (the next heaviest material from the lamella), which is sent ahead of R3 from the RAS—all of them being returned to the reactor 750, where the streams are exposed to different electron donors or acceptors, along the length of the reactor, or alternatively produce different donors or acceptors along such length. In this approach, many permutations or combinations of SRTs, electron donor and acceptor can be used to provide a matrix of niches for targeting the growth of different organisms. This is one approach for a multi-selection matrix that can be afforded from such multiple physical deselection concepts. This approach also enhances densification for improved settling or thickening properties. This is only one embodiment of many other possible embodiments.

DEFINITIONS OF SYMBOLS IN FIG. 10

M ... Mass of solids in reactor
loM ... Mass of solids with low retention time (e.g. $2/3$)
hiM ... Mass of solids with high retention time (e.g. $1/3$)
Mwas ... Mass of solids wasted per day
loMwas ... Mass of solids with low SRT wasted per day
hiMwas ... Mass of solids with high SRT wasted per day
avSRT ... average sludge retention time (e.g. 10 d)
loSRT ... low sludge retention time
hiSRT ... high sludge retention time
SE1,g ... Selection efficiency lamella for granules (e.g. 70%)
SE1,f ... Selection efficiency lamella for flocs (e.g. 50%)
SE2,g ... Selection efficiency cyclone for granules (e.g. 80%)
SE2,f ... Selection efficiency cyclone for flocs (e.g. 25%)
SE3,g ... Selection efficiency clarifier for granules (e.g. 100%)
SE3,f ... Selection efficiency clarifier for flocs (e.g. 100%)
Calculations
SRT of Sludge Fraction at Double Selection:

$$M = loM + hiM = 2/3 + 1/3 = 1$$

$$loMwas/Mwas = loM*(1-SE1,f)*(1-SE2,f)/(loM*(1-SE1,f)*(1-SE2,f) + hiM*(1-SE1g)*(1-SE2,g))$$

$$loMwas/Mwas = 2/3*(1-0.5)*(1-0.25)/(2/3*(1-0.5)*(1-0.25) + 1/3*(1-0.70)*(1-0.80)) = 92.6\%$$

$$hiMwas/Mwas = hiM*(1-SE1,g)*(1-SE2,g)/(loM*(1-SE1,f)*(1-SE2,f) + hiM*(1-SE1g)*(1-SE2,g))$$

$$hiMwas/Mwas = 1/3*(1-0.70)*(1-0.80)/(2/3*(1-0.5)*(1-0.25) + 1/3*(1-0.70)*(1-0.80)) = 7.4\%$$

$$loSRT = loM/(M/avSRT*loMwas/Mwas) = 2/3/(1/10*0.926) = 7.2\ d$$

$$hiSRT = hiM/(M/avSRT*hiMwas/Mwas) = 1/3/(1/10*0.074) = 45.0\ d$$

SRT of Sludge Fraction at Double Selection:

$$M = loM + hiM = 2/3 + 1/3 = 1$$

$$loMwas/Mwas = loM*(1-SE1,f)*(1-SE2,f)/(loM*(1-SE1,f)*(1-SE2,f) + hiM*(1-SE1g)*(1-SE2,g))$$

$$loMwas/Mwas = 2/3*(1-0)*(1-0.25)/(2/3*(1-0)*(1-0.25) + 1/3*(1-0)*(1-0.80)) = 88.2\%$$

$$hiMwas/Mwas = hiM*(1-SE1,g)*(1-SE2,g)/(loM*(1-SE1,f)*(1-SE2,f) + hiM*(1-SE1g)*(1-SE2,g))$$

$$hiMwas/Mwas = 1/3*(1-0)*(1-0.80)/(2/3*(1-0)*(1-0.25) + 1/3*(1-0)*(1-0.80)) = 11.8\%$$

$$loSRT = loM/(M/avSRT*loMwas/Mwas) = 2/3/(1/10*0.882) = 7.6\ d$$

$$hiSRT = hiM/(M/avSRT*hiMwas/Mwas) = 1/3/(1/10*0.118) = 28.2\ d$$

Figure 11:
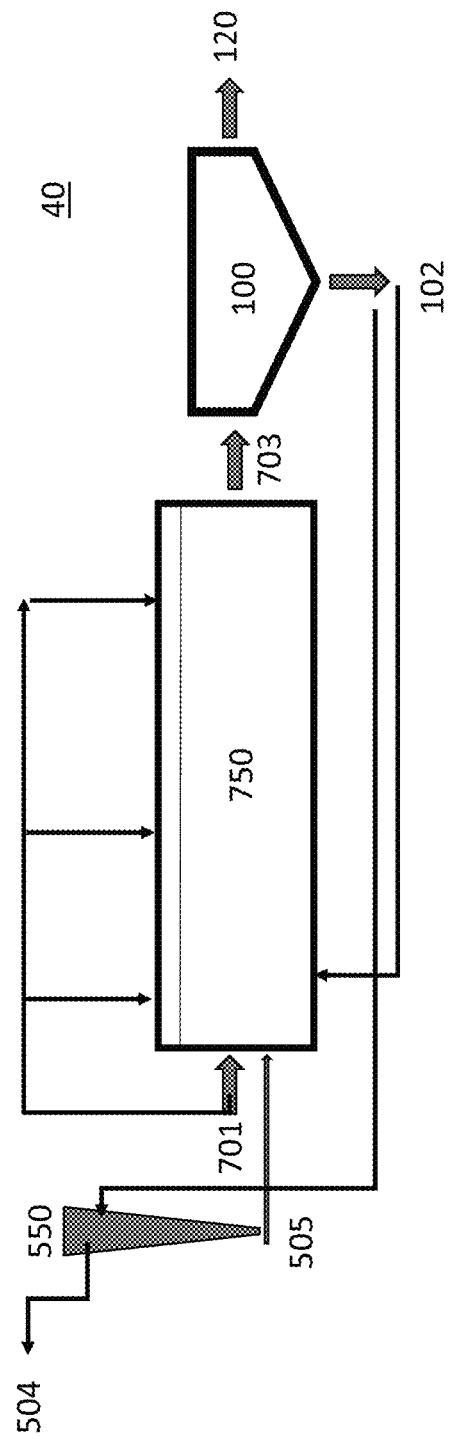
FIG. 11 depicts an embodiment of retardation of solids by a cascade flow using bypass of influent.

FIG. 11 depicts an embodiment of a wastewater treatment system 40 that includes a series of cascade flows from the influent 701 that are step wise fed to the reactor 750, thus retarding either the underflow 505 or the RAS 102, or both, that are returned to the reactor 750. The RAS 102 is the output of the clarifier 100, which has the influent 703 and effluent 120. The number of additional cascades beyond the influent at the front of the reactor 750 could vary from 1 to 6 but is more typically between 1 and 3. These cascade streams could preferentially contain any other flows, such as, for example, a digester liquor stream, fermentate, or external carbon, to provide tailored electron donor or tailored conditions for electron acceptor with the reactor to promote specific diffusion conditions for substrates (donors, acceptors and carbon source). In this manner, niches for resource allocation and production are developed along the reactor being differentially provided the recycle stream (in an embodiment, the stream in line 505 is fed ahead of the stream in RAS line 102) and the cascading influent streams. This approach can also enhance densification for improved settling or thickening properties.

Figure 12:
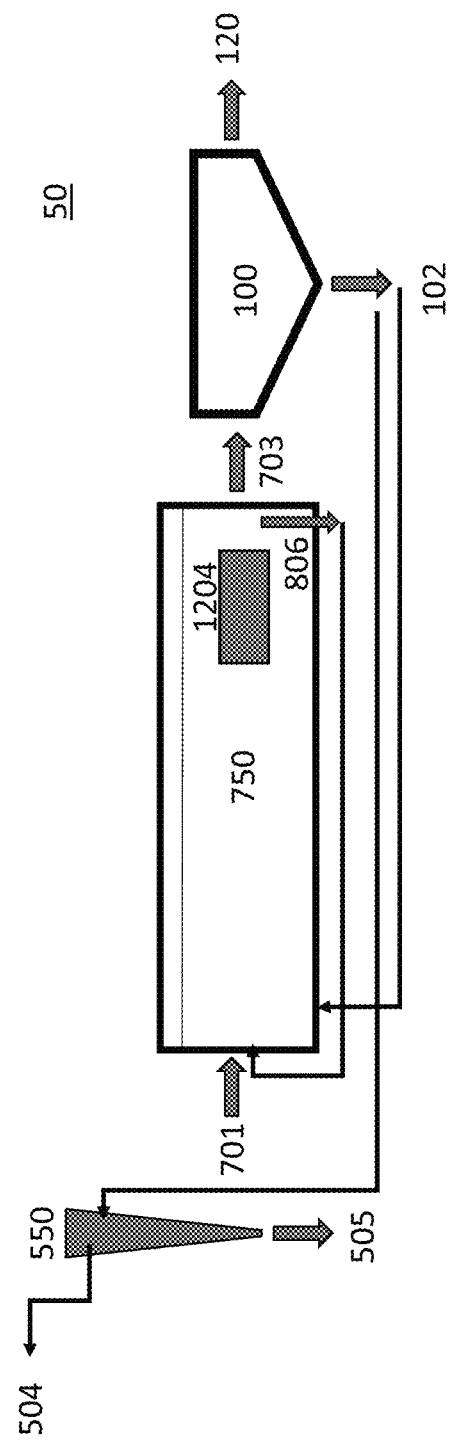
FIG. 12 depicts an example of a chemolitho or photo selector/deselector combined with a gravimetric selector/deselector.

FIG. 12 depicts an embodiment of a wastewater treatment system 50, including the influent 701 that is fed to the reactor 750, with the output 703 fed to the clarifier 100, with the output effluent 120. The RAS 102 flow can be returned to the reactor 750 at the same or differential location from the return of the underflow 505, which comprise the return stream from the DB deselector 550. The DB deselector 550 can be configured to receives its influent from the clarifier 100, such as, for example, from the RAS line 102.

In the embodiment depicted in FIG. 12, the reactor 750 can include an energy source 1204, which can include, for example, an electromagnetic energy source (for example, light source) or a chemolitho source (for example, source of any inorganic chemical, such as, for example, sulfur, iron, or limestone, etc.). The energy source 1204 can be arranged to provide either energy, electron donor or acceptor or inorganic carbon in the reactor 750. A C-1 organic or inorganic carbon, such as methane (for example, from a membrane biofilm), bicarbonate, can also be provided.

In an embodiment, the underflow of material in the reactor 750 containing larger or denser material can be retained, or returned in a mixed liquor recycle 806.

In various embodiments, the energy source 1204 can be located or applied at any point in the reactor 750 to take advantage of the multiple return streams, cascade streams or internal conditions present within the reactor 750. Thus, the layered approach, as discussed above, provides additional selection or deselection while providing possible synergies with other deselection or selection approaches to provide niches for growing organisms to provide treatment in an efficient, resourceful and resilient manner. This approach also enhances densification for improved settling or thickening properties. The process intensification can be considerable, while minimizing the energy consumption and providing additional treatment value.

Figure 13:
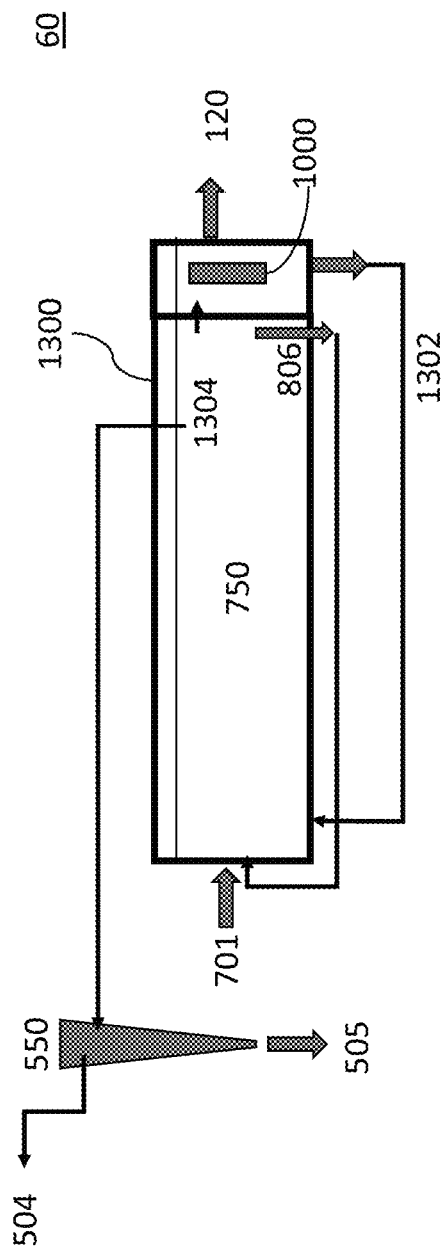
FIG. 13 depicts an example of a membrane tank with selectors/deselectors.

FIG. 13 depicts an embodiment of a wastewater treatment system 60 comprising a bioreactor 1300 and the DB deselector 550. The bioreactor 1300 can include the bioreactor 750 and a membrane bioreactor 1000. Any approach in the preceding FIGS. 1-12 can be performed with the membrane bioreactor 1000 instead of the clarifier 100.

In the embodiment depicted in FIG. 13, the treatment process can include the influent stream 701, effluent stream 120, and recycle streams 806 and 1302. The recycle stream 1302 can include a RAS (return activated sludge) stream output from the membrane bioreactor 100. The process can contain a surface waste approach 1304, that can supply surface waste material from the bioreactor 750 to an input of the DB deselector 550, thus performing double deselection, with the DB deselector 550 outputting the waste stream 504 and the underflow return stream 505. The return streams 806, 1302 can be differentially employed at same or multiple locations within the reactor 750 to optimize resource allocation or resource production, SRT uncoupling, or to at a minimum enhance overall densification for reducing fouling or increasing flux through the membrane from at least 120% to greater than 200% of a reference flux of approximately between 10-200 LMH. Other fluxes are also possible, especially for dynamic polymeric membranes or filters. The membrane bioreactor can be either polymeric or ceramic.

Figure 14:
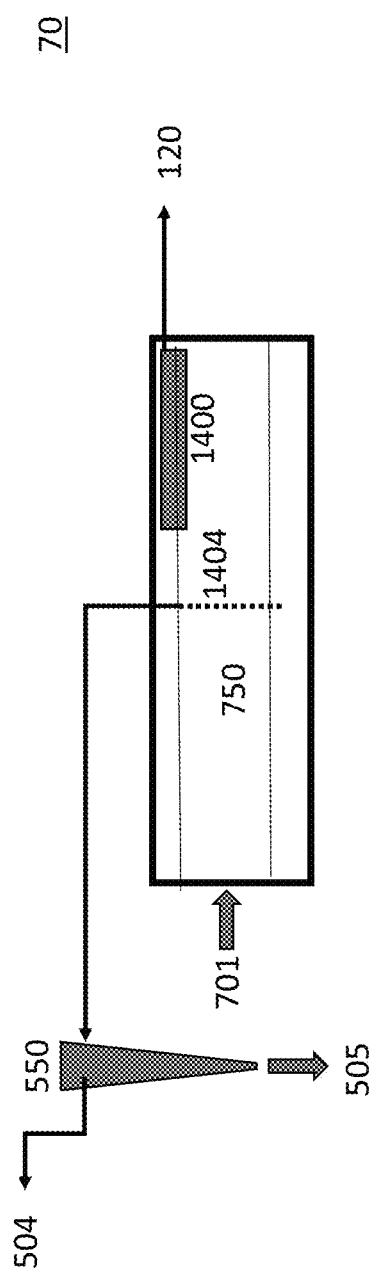
FIG. 14 depicts an example of a sequencing batch reactor with selectors/deselectors.

FIG. 14 depicts an embodiment of a wastewater treatment system 70, in which the bioreactor 750 is configured as a sequencing batch reactor. In this embodiment, the bioreactor 750 includes a decanter 1400 to perform clarification. Here, the influent flow is received at 701 and a decant flow is output by the decanter 1400 in the effluent 120. The surface waste can occur either in mix mode or settle mode 1404, to extract the lighter, poor settling fraction of sludge to the deselector DB 550. The double deselected overflow is wasted and the heavier underflow stream 505 is returned to the reactor 750, possibly even upstream of where the influent 701 enters the reactor 750. This approach provides SRT uncoupling, improved resource allocation or production and improved densification for improving settling or thickening from the double or multiple deselection.

Figure 15:
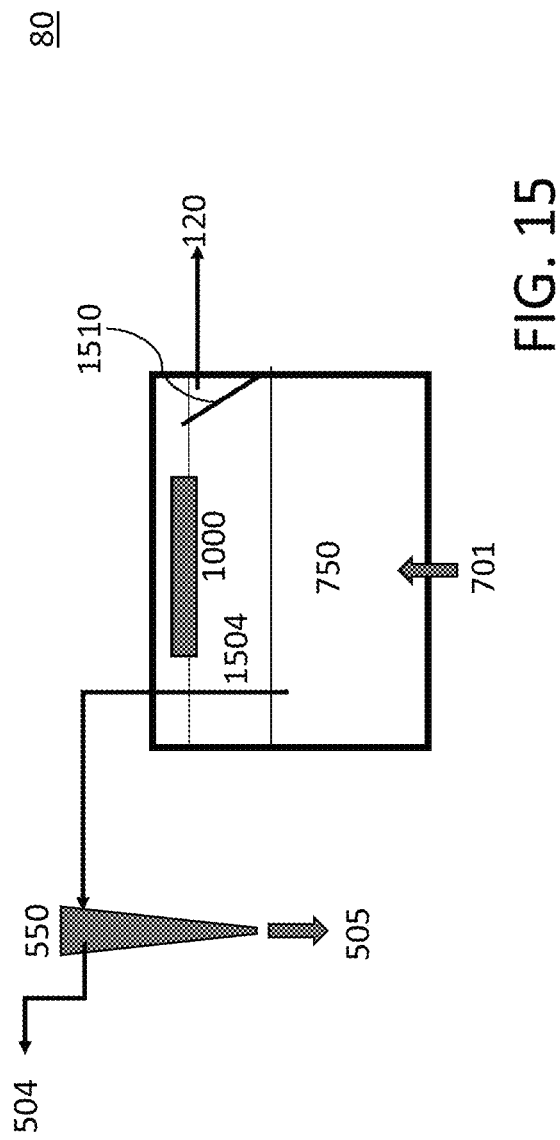
FIG. 15 depicts an example of an upflow reactor with selectors/deselectors.

FIG. 15 depicts an embodiment of a wastewater treatment system 80 comprising a near constant water level upflow reactor. In the embodiment, the reactor 750 can include the decanter 1000 and an integrate clarifier 1510. The system 80 can be configured to receive the influent feed 701, which is distributed at the bottom of the reactor 750. The effluent 120 is either decanted in the decanter 1000 or clarified in the integrated clarifier 1510, such as, for example, at the top of the reactor 750. The feed displaces the effluent 120 during the fill/discharge cycle. The decanter 1000 can be submerged during the react phase. The process is operated at a near constant water level in a timed sequence with multiple cycles. The solids are output at 1504 from or below the top of the blanket to the DB deselector 550. The double deselected waste stream 504 can be output from the DB deselector 550, and the underflow 505 can be returned to the reactor 750.

Figure 16:
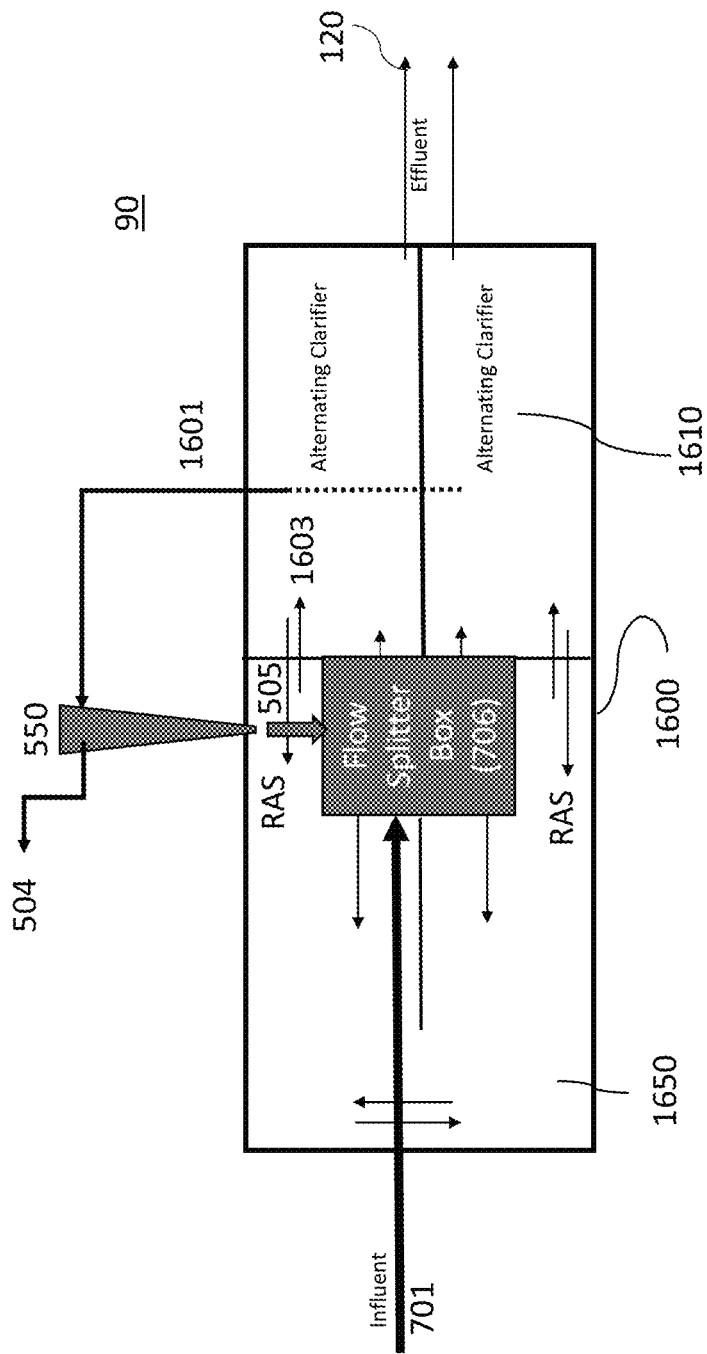
FIG. 16 depicts an example of a modified sequencing batch reactor with selectors/deselectors.

FIG. 16 depicts an embodiment of a wastewater treatment system 90 comprising a modified sequencing batch (MSB) reactor 1600. The MSB reactor 1600 can include a bioreactor 1650 and sequenced alternating clarifiers 1610. The MSB reactor 1600 can include a flow splitter box 706. The system 90 can be configured to receive the influent feed 701 and direct the feed to the flow splitter box 706. The flow splitter box 706 can include one or more air locks (not shown), as needed, to stop or control flow. The flow splitter box 706 can be arranged to cascade the flow to any part of the reactor 1650 or clarifier 1610 in a step manner.

In an embodiment, wet weather flows can directly be discharged from the flow splitter box 706 to the clarifier 1610.

In various embodiments, a step or cascade flow can enter an anaerobic or anoxic zone in the bioreactor 1650 prior to entering an aerobic, alternating aeration, or simultaneous nitrification/denitrification zone.

Treated liquor, as well as flow, in the MSB reactor 1600 can enter either of the alternating clarifiers 1610 via 1603, where the treated liquor (and/or flow) can be clarified and discharged in the effluent 120 from either clarifier 1610. The incoming flow in the influent 701 displaces the effluent 120.

In an embodiment, the clarifiers 1610 are constant water level reactors that are cycled to react or settle. Waste can be removed from either of the clarifiers 1610 and supplied via line 1601 to the DB deselector 550. The overflow can thus be double deselected and wasted at 504, and the underflow 505 can be sent to the flow splitter box 706. The waste in line 1601 can be removed: 1) from the surface of the reactor 1650 or clarifier 1610 when mixed; 2) from the top of the settle blanket (during settle mode); or 3) from the periphery of the clarifier 1610 in settle mode (away from the reactor, near the effluent). The underflow from DB deselector 550 can be returned to any location or time sequence in the MSB reactor 1600. This compact configuration has a cascade approach combined with multiple recycle streams to improve flow management, improved densification, and developing niches for improved resource (donor or acceptor) utilization or production. A membrane aerated biofilm reactor, or any other biofilm reactor could be included in the reactor 1650. Other reactions, with chemiolitho or photo sources, can also be included as needed, in which case the energy source 1204 (shown in FIG. 12) can be included.

In an embodiment, the wastewater treatment system can include an apparatus comprising: a reactor or a clarifier containing and processing activated sludge with a distinct on integrated clarification step in space or time, deselecting particles based on density, size, shear or compression; and, a first internal deselector that removes smaller or less dense particles from the reactor or clarifier followed by a second external deselector that further removes smaller or less dense particles.

The apparatus can contain particles with a range of solids residence times, for retaining fast and slow growing organisms, grown under aerobic, anoxic or anaerobic conditions, with different treatment functions such as for maximizing yield, nitrification, denitrification, deammonification, phosphorus removal, or micropollutant removal, wherein: the smaller particles exposed to double deselection, having lower solids residence times and lower internal mass transfer resistance for substrates, and thereby retaining only organisms with rapid growth rates of approximately greater than 2 days; and the large particles exposed to single or no deselection having higher solids residence times and higher internal mass transfer resistance for substrates, and thereby allowing for retaining organisms with slow growth rates of approximately less than 1 day.

The apparatus can contain particles with good settling properties supporting higher and more active solids inventories, wherein the solids inventories are greater than 2500 mg/L at a range of solids residence times ranging from less than 2 day to greater than 10 days thereby supporting more active inventories of both fast and slow growing organisms.

The apparatus can contain particles with good settling properties with sludge volume index less than 80 mL/g.

In an embodiment, the internal clarification deselection step in the apparatus can be performed: using any pump that supplies positive or negative pressure including using vacuum and air lift; or, at the surface of the reactor or clarification blanket; or, at the periphery of the clarifier; or, by applying negative or positive pressure on sludge collected within slotted or perforated manifolds, plates or pipes that are placed preferably near the periphery; or, using a baffle that directs and separates out sludge intended for deselection; or using a density separation device such as a lamella, classifier, centrifuge or hydrocyclone, or size separation device such as a screen or filter.

In an embodiment, the internal deselection step can be performed at the clarification underflow, with an internal mixing or recirculation of heavier particles collected with an internal or external lamella or decanter associated with the reactor.

In an embodiment, the reactor can comprise an activated sludge reactor, a reactor and clarifier, a sequencing batch reactor, a modified sequencing batch reactor, an integrated fixed film activated sludge reactor, an upflow reactor with integrated clarifier or decanter, or a membrane bioreactor.

In an embodiment, the apparatus can include a chamber that is configured to control and separate the WAS and RAS fractions between the internal selector(s) and/or external deselector(s) or after the internal selector(s) and/or external deselector(s). The apparatus can include two or more RAS streams from internal selector and external deselector, which can be sent to two or more, respective, locations in the reactor.

In an embodiment, a method for treating wastewater comprises deselecting, in a reactor containing and processing activated sludge with a distinct on integrated clarification step in space or time, particles based on density, size, shear or compression, including (i) a first internal deselector that removes smaller or less dense particles from a reactor or clarifier followed by (ii) a second external deselector that further removes smaller or less dense particles.

The method can include containing and processing activated sludge, including containing particles with a range of solids residence times, for retaining fast and slow growing organisms, grown under aerobic, anoxic or anaerobic conditions, with different treatment functions such as for maximizing yield, nitrification, denitrification, deammonification, phosphorus removal, or micropollutant removal, wherein: (a) the smaller particles exposed to double deselection, having lower solids residence times and lower internal mass transfer resistance for substrates, and thereby retaining only organisms with rapid growth rates of approximately greater than 2 days; and (b) the large particles exposed to single or no deselection having higher solids residence times and higher internal mass transfer resistance for substrates, and thereby allowing for retaining organisms with slow growth rates of approximately less than 1 day.

The method can include containing and processing activated sludge, including containing particles with good settling properties supporting higher and more active solids inventories, wherein: (a) the solids inventories are greater than 2500 mg/L; and (b) at a range of solids residence times ranging from less than 2 day to greater than 10 days thereby supporting more active inventories of both fast and slow growing organisms.

The method can be configured to contain particles with good settling properties with sludge volume index less than 80 mL/g.

The method can include performing the internal clarification deselection step using any pump that supplies positive or negative pressure including using vacuum and air lift.

The method can include performing the internal clarification deselection step at: (a) the surface of the reactor or clarification blanket; or the periphery of the clarifier.

The method can include performing the internal deselection step at the clarification associated with an internal recirculation associated with an internal or external lamella associated with the reactor.

The method can include performing the internal clarification deselection step by applying negative or positive pressure on sludge collected within slotted or perforated manifolds, plates or pipes that are placed preferably near the periphery or using a baffle that directs and separates out sludge intended for deselection.

The method can include performing the external deselection step using a density separation device such as a lamella, classifier, centrifuge or hydrocyclone or size separation device such as a screen or filter.

In various embodiments of the method, the reactor can include an activated sludge reactor, a reactor and clarifier, a sequencing batch reactor, a modified sequencing batch reactor, an integrated fixed film activated sludge reactor, an upflow reactor with integrated clarifier or decanter, or a membrane bioreactor.

In an embodiment of the method, a chamber can be included that controls and separates the WAS and RAS fractions between the selectors or after the selectors. The method can include separating two or more RAS streams from internal and external selection, where available, and supplying the RAS streams to respective different locations in the reactor, including to at least one feast zone or anaerobic selector stage.

In an embodiment, an apparatus for clarification of activated sludge comprises: (a) a clarifier containing two separate sludge withdrawals for return activated sludge; and (b) an internal deselector for waste activated sludge for separating lighter or less dense particles that occur at the surface of a blanket or away from the clarifier influent at the periphery, wherein the deselection for waste activated sludge occurs using negative or positive pressure using a vacuum, lift or pump mechanism that is applied either directly to the sludge or using collectors that are perforated or slotted pipes, plates or manifolds, or using baffles that direct or separate the two sludge withdrawals or rake arms that assist in collecting at least one of the two sludge withdrawals.

In an embodiment, a method for clarification of activated sludge comprises a clarifier containing two separate sludge withdrawals for return activated sludge and an internal deselector for waste activated sludge for separating lighter or less dense particles that occur at the surface of a blanket or away from the clarifier influent at the periphery. The method comprises deselecting for waste activated sludge using negative or positive pressure using a vacuum, lift or pump mechanism that is applied either directly to the sludge or using collectors that are perforated or slotted pipes, plates or manifolds, or using baffles that direct or separate the two sludge withdrawals or rake arms that assist in collecting at least one of the two sludge withdrawals.

In an embodiment, the wastewater treatment method comprises: supplying activated sludge to a reactor or clarifier, wherein the reactor contains and processes the activated sludge with a distinct on integrated clarification step in space or time, and deselects particles based on density, size, shear or compression; removing smaller or less dense particles from the reactor or clarifier by a first internal deselector; and further removing smaller or less dense particles by a second external deselector. The method can include containing and processing particles with a range of solids residence times, for retaining fast and slow growing organisms, grown under aerobic, anoxic or anaerobic conditions, with different treatment functions such as for maximizing yield, nitrification, denitrification, deammonification, phosphorus removal, or micropollutant removal, wherein: (a) the smaller particles exposed to double deselection, having lower solids residence times and lower internal mass transfer resistance for substrates, and thereby retaining only organisms with rapid growth rates of approximately greater than 2 days; and (b) the large particles exposed to single or no deselection having higher solids residence times and higher internal mass transfer resistance for substrates, and thereby allowing for retaining organisms with slow growth rates of approximately less than 1 day. The method can include containing and processing particles with good settling properties supporting higher and more active solids inventories, wherein: (a) the solids inventories are greater than 2500 mg/L; and (b) at a range of solids residence times ranging from less than 2 day to greater than 10 days thereby supporting more active inventories of both fast and slow growing organisms. The method can comprise: containing and processing particles with good settling properties with sludge volume index less than 80 mL/g; or performing the internal clarification deselection step using any pump that supplies positive or negative pressure including using vacuum and air lift; performing; or performing the internal clarification deselection step at the surface of the reactor or clarification blanket, or the periphery of the clarifier; or performing the internal clarification deselection step by applying negative or positive pressure on sludge collected within slotted or perforated manifolds, plates or pipes that are placed preferably near the periphery or using a baffle that directs and separates out sludge intended for deselection. The method can include performing the internal deselection step: at the clarification associated with an internal recirculation associated with an internal or external lamella associated with the reactor; or using a density separation device such as a lamella, classifier, centrifuge or hydrocyclone or size separation device such as a screen or filter. The method can include a reactor comprising, for example, an activated sludge reactor, a reactor and clarifier, a sequencing batch reactor, a modified sequencing batch reactor, an integrated fixed film activated sludge reactor, an upflow reactor with integrated clarifier or decanter, or a membrane bioreactor. The method can include a chamber that controls and separates the WAS and RAS fractions between the selectors or after the selectors. The method can include two RAS streams from internal and external selection that are sent to two different locations in the reactor, including to at least one feast zone or anaerobic selector stage.

In an embodiment, a method for clarification of activated sludge comprises: supplying the activated sludge to a clarifier containing two separate sludge withdrawals for return activated sludge; and supplying waste activated sludge to an internal deselector for separating lighter or less dense particles that occur at the surface of a blanket or away from the clarifier influent at the periphery, wherein the deselection for waste activated sludge occurs using negative or positive pressure using a vacuum, lift or pump mechanism that is applied either directly to the sludge or using collectors that are perforated or slotted pipes, plates or manifolds, or using baffles that direct or separate the two sludge withdrawals or rake arms that assist in collecting at least one of the two sludge withdrawals.

In an embodiment, an apparatus for clarification of activated sludge comprises: (a) a clarifier containing two separate sludge withdrawals for return activated sludge (RAS); and (b) an internal deselector for waste activated sludge (WAS) for separating lighter or less dense particles that occur at the surface of a solids blanket or away from the clarifier influent at the periphery, wherein the deselection for waste activated sludge occurs using negative or positive pressure using a vacuum, lift or pump mechanism that is applied either directly to the sludge or using collectors that are perforated or slotted pipes, plates or manifolds, or using baffles that direct or separate the two sludge withdrawals or rake arms that assist in collecting at least one of the two sludge withdrawals.

It is understood that the various disclosed embodiments are shown and described above to illustrate different possible features of the disclosure and the varying ways in which these features can be combined. Apart from combining the features of the above embodiments in varying ways, other modifications are also considered to be within the scope of the disclosure. The disclosure is not intended to be limited to the preferred embodiments described above. The disclosure encompasses all alternate embodiments that fall literally or equivalently within the scope of these claims.

The terms "a," "an," and "the," as used in this disclosure, means "one or more," unless expressly specified otherwise.

The term "approach," as used in this disclosure, means "a method or a process," unless expressly specified otherwise.

The terms "including," "comprising," "having" and their variations, as used in this disclosure, mean "including, but not limited to," unless expressly specified otherwise.

References in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format can be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" can be interpreted to include not only the explicitly recited concentration of about 0.1 wt. % to about 5 wt. %, but also the individual concentrations (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y,"" unless indicated otherwise. Likewise, the statement "about X, Y, or about Z" has the same meaning as "about X, about Y, or about Z," unless indicated otherwise.

The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G." A comma can be used as a delimiter or digit group separator to the left or right of a decimal mark; for example, "0.000,1"" is equivalent to "0.0001."

The term "wastewater," as used in this disclosure, means "water or wastewater," unless expressly specified otherwise.

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" can be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

The invention claimed is:

1. A water or wastewater treatment system, comprising:
   an influent containing contaminated water;
   a reactor comprising (i) an inlet, (ii) a bioreactor, (iii) an internal deselector, and (iv) an outlet, wherein:
   (i) the inlet is configured to receive the influent and supply the contaminated water to the bioreactor;
   (ii) the bioreactor is configured to disperse the contaminated water in a solid-liquid mixture, treat the solid-liquid mixture and form biological solids;
   (iii) the internal deselector is configured to retain, or retard, a first portion of the biological solids from the solid-liquid mixture and output a deselected solid-liquid mixture comprising a second portion of the biological solids; and
   (iv) the outlet is configured to receive the deselected solid-liquid mixture and output the deselected solid-liquid mixture, including the second portion of the biological solids, from the reactor; and
   a particle deselector configured to receive the deselected solid-liquid mixture and deselect part of the second portion of the biological solids in the deselected solid-liquid mixture to output the deselected part of the second portion of the biological solids; and
   a return line configured to supply a remaining part of the second portion of the biological solids to the reactor, wherein the bioreactor comprises a feed zone that receives the influent using a differential influent cascade approach or differential feast famine approach;
   wherein the biological solids include particles having an average solids residence time (avSRT) for selecting fast and slow growing organisms with different treatment functions, hereby improving an efficiency of the deselection, wherein: particles in the deselected part of the second portion of the biological solids have a solids residence time (loSRT) that is lower than the average solids residence time (avSRT); and particles in the retained or the retarded part of the second portion of the biological solids have a solids residence time (hiSRT) that is higher than the average solids residence time (avSRT); wherein the particle deselector comprises at least one of a density-based (DB) deselector or a particle size-compressibility (PSC) deselector or a particle shear and
   wherein the internal deselector is configured to perform an internal deselection step to deselect the second portion of biological solids using:
   a mixing source;
   a visible, ultraviolet or infrared photo source;
   a heat source;
   a gas source;
   a pressure source;
   an electromagnetic source; or
   a flow source.

2. The water or wastewater treatment system in claim 1, wherein the particle deselector is configured to deselect the part of the second portion of the biological solids using at least one of solids particle density, size, shear-resistance, or compressibility.

3. The water or wastewater treatment system in claim 1, the water or wastewater treatment system further comprising at least one of a decanter, a clarifier, a separator, a membrane, and a filter configured to separate solid particles having predetermined characteristics from the solid-liquid mixture.

4. The water or wastewater treatment system in claim 1, wherein the deselected part of the second portion of the biological solids from the outlet includes particles comprising: a sludge volume index less than 80 mL/g; or improved membrane flux or reduced membrane fouling.

5. The water or wastewater treatment system in claim 1, wherein the internal deselector is configured to apply a negative or a positive pressure at or near:
   a. a reactor interface of the bioreactor;
   b. a clarifier interface;
   c. a surface of the reactor;
   d. a surface of a settling blanket;
   e. a periphery of a clarifier;
   f. a feed zone in the bioreactor, wherein influent or recycles are supplied; or
   g. a discharge zone in the bioreactor or a clarifier, from which an effluent or recycles are output.

6. The water or wastewater treatment system in claim 1, wherein the internal deselector comprises:
   one or more slotted manifolds;
   one or more perforated manifolds;
   one or more plates;
   one or more pipes; or
   one or more baffles,
   wherein the pipes are placed at or near a periphery of the reactor or a clarifier and the baffle is configured to direct and separate sludge at the periphery of the reactor or the clarifier.

7. The water or wastewater treatment system in claim 1, wherein: said first portion of the biological solids and said deselected part of the second portion of the biological solids are supplied as recycle streams from the internal deselector and particle deselector, respectively, to at least two different locations in the bioreactor; or
   said second portion of the biological solids and said deselected part of the second portion of the biological solids are deselected by the internal deselector and particle deselector, respectively, to increase one or more of microbially produced electron donor, electron acceptor or carbon, and to provide at least 20% of electron donor, electron acceptor or carbon requirements for operation of the bioreactor.

8. The water or wastewater treatment system in claim 1, wherein the reactor comprises:
   a continuous flow reactor;
   a sequencing batch reactor;
   a modified sequencing batch reactor;
   an integrated fixed film activated sludge reactor;
   an upflow reactor with integrated clarifier;
   an upflow reactor with integrated decanter;
   a membrane bioreactor;
   a membrane biofilm reactor;
   an electro-biochemical reactor;
   a moving bed biofilm reactor: or
   a fixed bed reactor.

* * * * *